US011151243B1

(12) United States Patent
McNamara, Jr. et al.

(10) Patent No.: US 11,151,243 B1
(45) Date of Patent: Oct. 19, 2021

(54) PASSWORD HOPPING SYSTEM AND METHOD

(71) Applicants: Thomas M. McNamara, Jr., Ellicott City, MD (US); Jason T. Good, Tullahoma, TN (US); Carly J. Bruce, Pittsburgh, PA (US)

(72) Inventors: Thomas M. McNamara, Jr., Ellicott City, MD (US); Jason T. Good, Tullahoma, TN (US); Carly J. Bruce, Pittsburgh, PA (US)

( * ) Notice: Subject to any disclaimer, the term of this patent is extended or adjusted under 35 U.S.C. 154(b) by 0 days.

(21) Appl. No.: 16/015,923

(22) Filed: Jun. 22, 2018

(51) Int. Cl.
   *G06F 7/04* (2006.01)
   *G06F 15/16* (2006.01)
   *H04L 29/06* (2006.01)
   *G06F 21/46* (2013.01)

(52) U.S. Cl.
   CPC ............ *G06F 21/46* (2013.01); *H04L 63/083* (2013.01)

(58) Field of Classification Search
   CPC ................................ G06F 21/46; H04L 63/083
   USPC ............................................................ 726/6
   See application file for complete search history.

(56) References Cited

U.S. PATENT DOCUMENTS

| 2005/0114675 A1* | 5/2005 | Ginzburg | G06F 21/36 713/182 |
| 2015/0067799 A1* | 3/2015 | Li | H04L 63/0838 726/6 |
| 2015/0163218 A1* | 6/2015 | Mohan | H04L 63/0846 726/6 |

* cited by examiner

*Primary Examiner* — Jeffrey C Pwu
*Assistant Examiner* — Samuel Ambaye
(74) *Attorney, Agent, or Firm* — John L. Sotomayor

(57) ABSTRACT

The present invention is a system and method for the repeated, dynamic, and automated transformation and manipulation of strings of printable or typeable characters that are commonly used for passwords, PINs, keys, tokens, keys, encryption, and filenames forming a class of printable strings. The system and method described makes use of secured password "Hopping" to maximize data security and user's ease of implementation. "Hopping" refers to a method of automated random-password construction and serial substitution. The process of Hopping as described herein is based upon a set of user-selected transformation rules that employ, among other variables, easily accessible, time-variable, data as sources of randomized inputs. Use of randomized inputs and automated serial substitution at time intervals heightens the security of resulting generated passwords.

12 Claims, 15 Drawing Sheets

PASSWORD HOPPING SYSTEM AND METHOD

CROSS-REFERENCE TO RELATED APPLICATION

This application claims the benefit of priority of U.S. Provisional Application No. 62/524,228, filed Jun. 23, 2017, entitled "Password Hopping System and Method" which is herein incorporated in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

This innovation relates generally to digital "passwords" used to limit access to privileged data. The term "passwords" represents a broad class of printable character strings that form the basis of digital or electronic protection. This includes passwords, personal identification numbers (PINs), keys, tokens, encryption seeds, filenames, and directory or folder names.

Password use is a common and widespread "access control" convention used wherever electronic transactions between two parties occur or trusted access to information is necessary. Passwords are essential in processes to "authenticate" a user in a transaction and are intended to be secret. Access to information results when a user that has been previously authorized or registered with a second party is permitted by the authenticator to have access to information guarded by any access control system or methodology.

Password security practices and de-facto standards are based on a philosophy of "strength", which may be viewed as complexity and length of the password, to achieve a valid user authentication. This approach results only in the appearance of security. When sensitive information is combined in a single database of a closed network, an intruder only needs to find the weakest authentication credentials to penetrate secure areas of the network and have access to the entire file systems maintained on one or more computer systems. Security from strong passwords is only achievable if every password is strong and kept secret.

Password selection is a user choice, is subject to password theft or unauthorized disclosure, and has been the root cause for many high-profile and large data breaches. Once a breach occurs and a credential database can be removed from a closed network, computing technology and the ingenuity of hackers can "crack" encryption features rather quickly. Thus, all security is lost—even for a user who used strong passwords.

The desire of users for simplicity and convenience leads users to select weak, reused, or old passwords. Such user behavior undermines authentication security policies and practices. Most users are unable to remember complex and long password strings, increasing user frustration and user avoidance of recommended password security practices. Exposure of private and sensitive information from weak, stolen, old, unauthorized, or cracked passwords results in serious privacy and economic consequences including lost customer privacy and identity theft for the user, and regulatory penalties, brand erosion, and high remediation costs for business.

The trend for the past decade has been the increased imposition of security requirements on user's passwords, such as length, character types, scheduled password expiration, restricting password reuse, by authenticators. More recently, industry has introduced new technology to allow additional "factors" such as biometric data validation to be used to authenticate a user. Nonetheless, passwords remain as the ubiquitous and primary method of authentication for the majority of Internet and business users.

To manage the difficulty with remembering many passwords and creating strong passwords, industry has introduced password managers as a way for users to create longer complex passwords and store them on their computers and mobile devices or 'cloud' servers. Also, popular web browsers integrate a password manager to allow users to save a password at the time they register on a website. The password is stored, although sometimes not securely, and automatically recovered and submitted in authentication forms when the user returns to a site's login page.

Another existing solution is the use of soft and hard tokens that augment the use of a password. The token is generated for one-time use and provided to the user. When in use, the token is usually sent to a user's phone as an SMS message or via a mobile app or alternatively via a separate hardware device that displays the short one-time code. The token must accompany the password for authentication of the user. This process is one example of two-factor authentication.

Yet another solution is the use of fingerprints as a biometric method to authenticate a user. Other biometric data may include iris scans, voice printing, and facial recognition. Still other methods include behavior monitoring where a user's interactions with their computing device are monitored for comparison with prior history.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
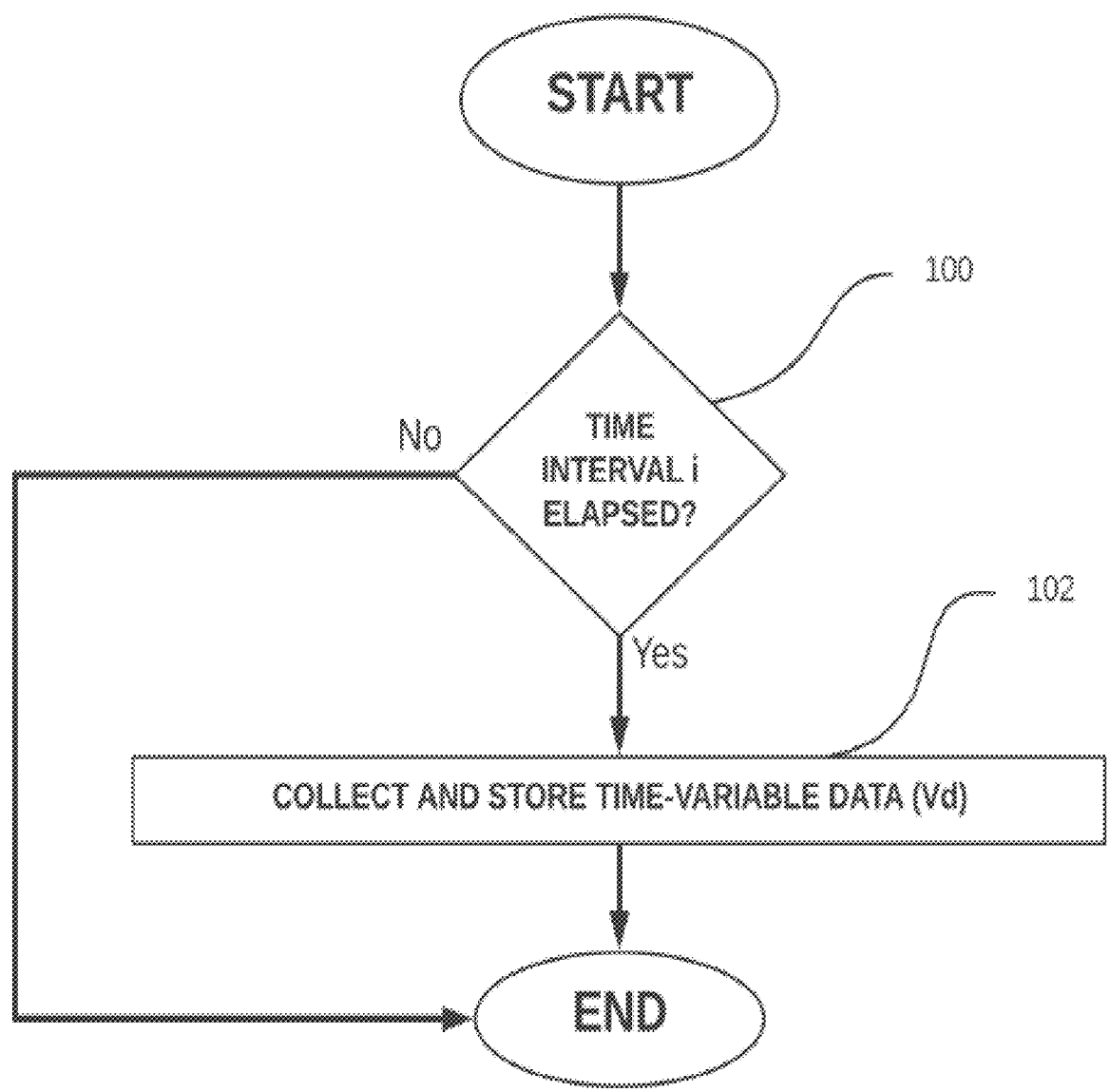
FIG. 1 is a process flow diagram for the password creation and communication of the same by an Algorithm Server to an Authentication Server consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The terms "paired" and/or "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "device" refers to any electronic device with network communication access such as, but not limited to, a cell phone, smart phone, tablet, iPad, networked computer, internet computer, laptop, watch or any other device, including Internet of Things devices, a user may use to interact with one or more networks or represent an endpoint of user interactions.

Reference herein to "Hopping" refers to a method of automated random-password generation and serial substitution at specified time intervals. The process of "Hopping" as described herein is based upon a hopping algorithm comprised of a specified time interval and a set of specified construction and transformation rules that employ, among other variables, easily available time-variable data sources as providers of randomized inputs. Use of randomized inputs heightens the security of resulting generated passwords.

Throughout this document the terms "dynamic data," "dynamic information," and "time-variable data" are used interchangeably.

The desire of users for simplicity and convenience in their own access to protected digital data often leads to weak, reused, or old passwords. By its very nature, use of weak, reused, or old passwords undermines existing authentication security policies and practices. A recent report by Cyber Ventures, Ltd. estimates " . . . more than 3 billion user credentials and passwords were stolen in 2016, with 8.2 million passwords being stolen every day and approximately 95 passwords stolen every second." Security experts have advocated extensively on the need for stronger password habits and federal recommendations have been established for commercial businesses that collect and safeguard personal identifying information (PII). Most users are unable to remember complex and long password strings, increasing their frustration and avoidance of the recommended password security practices. Exposure of private and sensitive information from weak, stolen, old, unauthorized, or cracked passwords results in serious privacy and economic consequences to users and businesses.

As a method of security access for a broad base of users, in all systems that must be accessed remotely, passwords are ubiquitous. A recent study estimated that over 75 billion passwords are used online today (within both public and private networks), and this number is expected to grow to nearly 300 billion by 2025, largely from an increase in IoT devices. Passwords may also be a problem. They are meant to allow access to authorized individuals only but are failing to achieve this purpose. The clearest evidence of this is the ever-increasing number and size of reported data breaches and the growing frequency and number of exposed login credentials sold online. Over 1300 data breaches were reported in the US last year. Many of these exposed personal data such as email user names and passwords for sale on the "dark web." One estimate is that breaches have exposed more than 4.8 billion passwords for sale online. This horde of login credentials has led to "credential stuffing" as a new exploit for hackers and cyber-criminals to breach security at yet more online sites. The easy availability of a large number of email addresses and passwords also promotes increased ransomware attacks.

There is a reason why passwords are so widely used and accepted. They are personal, private, easily replaced, easy to remember, accepted as reliable for most authentication purposes, and are low-cost to implement. However, they are also static, easily misused, may be weak (short, familiar, or easily guessed), re-used, lost, and stolen. To overcome these issues, many security managers introduce password policies to avoid weak and old passwords. But these policies have not proven to be effective and have introduced "security fatigue" as Users are unable to comply with the onerous and ineffective password creation requirements issued by security managers. Additionally, many password authentication systems in use by businesses rely on old technology, lack up-to-date security patches, or are poorly configured and poorly administered by businesses. These introduce significant vulnerabilities to business systems and risk the privacy of customer data. In addition, business employees who use the same passwords for business and personal logins, which is a common practice, add further risk.

Although other solutions to the password problem may exist today, some of these solutions also introduce new problems that may be worse than today's password problem.

As an example, Password Managers offer Users a digital wallet or vault to store and protect their passwords and retrieve them with a master password. Some create random, strong, passwords for the user, reset passwords automatically at certain sites, and autofill password fields on web site login pages via the User's web browser. Although some of these features provide convenience, they also introduce security vulnerabilities. Since the passwords contained in a password manager are static, a User's risk of loss due to a data breach is not lessened because many breaches exist for months or years before they are detected. And, of course, the loss of the master password to theft or misuse exposes all passwords to loss from a single event.

One-Time Tokens are short codes that are provided to a User by either a hardware device, such as a fob, or a software device, such as a smartphone application, or an SMS text message. One-time tokens are not a complete replacement for passwords, but rather augment the password by adding a second factor of authentication (2-factor authentication or "2FA). While providing stronger authentication security, 2FA is not widely adopted. 2FA requires a hardware device which adds cost to the security solution, interrupts the login experience, particularly for smartphone apps, and authentication is blocked if your device is not physically located with you.

Biometric authentication may use sensors already present on a User's hardware device(s) to collect personal information such as fingerprints, facial recognition, voice recognition, iris scanning, and others. Biometrics might appear to provide strong authentication security, but research shows they can be spoofed and biometric data is generally public rather than private, so it is easily collected. There is also a significant public concern with loss of privacy, trust of data storage, and irreplaceability if stolen, altered, or otherwise compromised. And, like tokens, Biometric solutions require the User to use a hardware device that is configured with the right sensor(s) at the time of authentication.

Therefore, a need exists for a system and method to increase password security while resolving the conflict between data security and ease of use. The innovation described herein is a system and method for the repeated, dynamic, and automated construction, transformation and manipulation of strings of printable or typeable characters that are commonly used for passwords, PINs, keys, tokens, encryption, and filenames, which may be defined as a class of printable strings. The system and method described makes use of secured password "hopping" to maximize data security and a user's ease of implementation. In an embodiment, passwords are representative of a variety of printable character strings used to identify information, including server port numbers, file names, folder names, credit card CVV codes, bank debit card PINs, Keys, Nonces, random number seeds, and other character strings associated with information security. Any of these identifying strings can be the object of the hopping invention described as "password hopping". The term "password" is therefore representative of any identifying string used for labeling or protecting access to other information. The precise methodology of application may vary from that described herein for passwords, but the claims and novelty of the invention remains unchanged by its application to other identifying strings.

In an embodiment, an innovative system as herein described solves the password problem that has plagued information security for decades. In such a solution, entitled Active Password Management (APM), the APM incorporates a Password Hopping System (PHS) that is a central element that enables Users to actively manage their passwords and balance password security strength with simplicity. As several security experts have publicly commented, a solution must be strong and simple if it is to be effective. The PHS constructs passwords from secret user-specified algorithms and easily available time-variable information sources that are automatically replaced (hopped) at secret time intervals. The construction of all hopped passwords begins with time-variable information "hidden in plain sight," within an easily available information Source. The resulting hopped passwords achieve a User-controlled level of information security by balancing password entropy (complexity and length) with password disposability (lifetime). In this embodiment, APM actively involves both people and businesses in their security. Control, and the balance of strong security and simplicity for the User, occurs at an individual level. APM allows a User to define an activity level for password hopping and consequently align User configuration parameters of the Algorithm Server to default values that ensure security is optimized. In a non-limiting example, a less active APM level might configure the Algorithm Server for monthly password hops with a sophisticated set of data enhancement and transformation "rules" that comprise a "Formula" specified by the User (constructing a longer password). Whereas a more active APM level might default to a daily hopping Schedule with simpler Formula to construct a simpler password. Simpler, easy-to-remember passwords can achieve a high security level when their useful lifetime is automatically short.

The primary benefit of password hopping for individuals, which includes consumers or employees, is simple and secure disposable passwords with finite lives that improve the security of Users' information without adding complexity or inducing security fatigue. Short automated hopping schedules and easily available dynamic information mitigate password weaknesses such as reuse and provide users improved self-protection if a business is negligent, has poor security controls, or the User's password is stolen or otherwise compromised, regardless of whether or not any of these activities are detected.

In an exemplary embodiment, where a business relies on the PHS as their sole authenticator and the PHS provides "authentication as a service" for all user (customer and employee) access to accounts and services, information security is strengthened. Because the Algorithm Server only stores password construction rules and passwords are constructed at the moment of use, there are no stored passwords. In a non-limiting example, a business uses the PHS for all of its users and all passwords used in authentication are hopped passwords. Uniquely, the business no longer stores passwords and no passwords exist to be targeted, stolen, or misused. In this embodiment, the Algorithm Server may be configured so that user passwords for employer accounts (work passwords) are isolated from their passwords used for personal accounts. In a non-limiting example, the User may specify employer-specific dynamic information sources for their work accounts, and different dynamic information sources for their personal accounts, and apply the same Formula for the construction of passwords for work accounts that will never be the same as those for their personal accounts. The PHS uniquely and automatically mitigates a common information security vulnerability of password reuse between work and personal accounts.

In an embodiment, a user may choose to authenticate their identity with a business online via the business's website that may include an "Authentication Server," and which may be supplemented with a "Password as a Service" server, which is referred to herein as an "Algorithm Server". The Algorithm Server helps a user to secure their online identity by creating and replacing, or "hopping," random passwords at appropriate, pre-configured or specified time intervals to limit the life of any given password. The Algorithm Server stores and applies Formula rules to dynamic information to construct unique, dynamic passwords that may be easily and simultaneously known to the user without communication of any of the passwords. By limiting a password's life, a user may limit the time within which it can be misused or exploited. Frequent hopping enhances security without adding to password complexity. The Formula is fed user-selected time-variable information, such as, in non-limiting examples, websites, newsfeeds, or data services that may be easily observable through being open source. In an embodiment, user-selected dynamic information may also include limited access sources such as email newsletters or private subscription content. Additionally, the dynamic information sources may be those that change frequently. In non-limiting examples, appropriately dynamic and unpredictable information used for a Formula may include news story headlines, weather data, or any other content that is readily available through public or limited access sources but changes on a frequent basis.

Enhancement and transformation rules are applied to the dynamic information to construct unique dynamic passwords that can be easily and simultaneously known by both the User and Authenticator without communication of the password between them. Uniquely, the underlying dynamic information used in password hopping is hidden in plain sight, with Formula rules and dynamic data sources known only to the Algorithm Server and the User. Not only can a vast number of dynamic information sources be used for Formula source information, more obscure dynamic data sources such as a corporate newsletters or industry publications can be used to further heighten security. Even the rules themselves can be hopped to increase security measures. With password hopping the most effective security measure is the hopping frequency, which is defined as the scheduled number of hops and the scheduled time intervals for initiating each password hop. Secure password hopping occurs as a background process without a need to communicate the one or more newly constructed passwords resulting from the hopping activity to the user. The method of hopping passwords with time-variable information hidden in plain sight is a departure from existing conventional password security approaches.

In an exemplary embodiment, a user may log into an Algorithm Server and specify a particular set of conditions to create Formula rules. The conditions specified by a user may include, but are not limited to, the source of dynamic data, the coordinate position within the dynamic data source of time-variable data to be used, the desired interval at which the hopping algorithm is triggered, and third-party web sites where the resulting hopped password is to be used.

The user may prefer to manually collect the time-variable data and apply Formula rules to determine a current Password. The user may then log into his account at any third-party Authentication Server and update the existing Password with the newly created Password. The user may then log out of any third-party Authentication Servers and use his new password to login at a later time. Unfortunately, manually hopping passwords is equivalent to current static passwords that change only as frequently as the user changes their password and provides no real security benefit to the user.

In an exemplary embodiment, an automated service is preferred to actively manage the password hopping activity for users. To perform this process, the user would establish an account with the PHS "password as a service" server, the Algorithm Server, and define Formula rules through which the hopping activity would be performed, as well as identify the dynamic information sources of choice for the user. In a non-limiting example, the user also specifies a desired hopping schedule (date and/or time interval) of a specific time-period and provides the website address(es), in the form of one or more URLs or domain names, of user private content where the passwords are needed to authenticate and gain access.

In this embodiment, the "pairing" of a Formulas and hopping Schedules to a plurality of User's accounts at a plurality of TPV web sites ensures that authentication to the right TPV web site account occurs. Pairing requires the verification of a User's TPV account credentials upon first use of the password hopping service with the TPV Authentication Server. Once the pairing is complete, authentic user passwords provide access to their TPV account and private content.

At the expiration of the time interval, the Algorithm Server collects new dynamic information from a specified information source and stores it for use in password construction at any time during the current hopping interval. When the user connects to TPV Authentication Server to login, the Authentication Server calls the Algorithm Server via an application programming interface (API) utilizing a unique private key. The Algorithm Server verifies the key and presents to the user (via the TPV web server) a login page to collect the username and current hopped password. Both credentials submitted by the user are only received by the Algorithm Server and the submitted password is compared with the authentic password that is instantaneously constructed (using the Formula rules and stored dynamic information) by the Algorithm Server. If the passwords match, then the Algorithm Server authenticates the user to the Authentication Server (via the API) and the user is granted access to their private content within the TPV web site.

This process continues without any further intervention from the user and dynamic information is collected and stored many times during a user's online absence from a particular TPV web site and Authentication Server depending upon the chosen hopping
Schedule.

In this embodiment, when the user next visits a TPV site and authentication is required, the user may easily compose the correct password by knowing the Formula rules that the user previously specified and visiting the easily available information source to identify the time-variable data at the coordinate position previously specified. The result is a user authentication with a strong dynamic password that may be frequently replaced. And because of the potentially short lifespan of the dynamic password, sensitive user data is far more invulnerable to exploit if the password is stolen or exposed. The exposure to the loss or theft of the password is also limited by the secrecy of the user-specified time interval for the hopping activity.

In a non-limiting example, a password subject to a hopping schedule specifying an interval of twenty-four hours would be replaced with a unique random password six times in a week. A password subject to hopping on a twelve-hour interval could lead to thirteen passwords in the same week-long time period.

In an alternative embodiment, the hopping activity may serve as the second factor in a Two-Factor Authentication (2FA) process. A User Formula rule may specify a secret non-variable character string (any fixed character string) as one part of a hopped password. A second Formula rule may specify the time-variable part of a hopped password. In this non-limiting embodiment, Factor 1 "something you know," is the user-specified non-variable character string, and Factor 2 "something you get or have" is the time-variable data (or its transformed version). The combination of both password parts (factor 1 and factor 2, in any order) is compliant with 2FA security criteria. Both factors are present in a single password without the need for additional devices or the vulnerability of code communication at the time of authentication. As a result, the user login experience is not disrupted and this invention may represent a commercially valuable chokepoint for future authentication security.

In an embodiment, the PHS is a system for improving the security and simplicity of passwords using repeated, frequent, timed construction of disposable passwords by remote, automated means without required communication of any password between any involved party. A plurality of user-specified Sources, Formulas, and Schedules (together a hopping algorithm) may be specified by users to construct personalized passwords that are more convenient to use and easier to memorize. In this embodiment, security strength is achieved from a balance of password complexity, through length and entropy, and password life such as that provided by the hopping schedule, rather than the password alone. The security strength is user controlled through a combination of dynamic information source, the coordinate position of time-variable data, Formula rules, and hopping schedule. Simpler and shorter passwords constructed from random information and hopped more frequently can achieve the same security strength as longer and more complex passwords that are hopped less frequently.

In an embodiment, the automated construction of customized passwords using dynamic information sources containing time-variable data hidden in plain sight may use a variety of sources. In a non-limiting example, a user may specify publicly accessible sources, such as news headlines, from a plurality of providers. In an alternative non-limiting example, a user may specify privately accessible sources, such as emails or e-newsletters with limited access, or may specify closed information sources, such as might be available in a corporate environment.

In an exemplary embodiment, a User joining a "password as a service" provider may construct a master password Formula to access their configuration data within the PHS, such as specified dynamic information source, Formula rules, and others. The master password Formula may be expressed in one or more password construction rules. The User's master password resulting from their master password Formula may provide access to the User's PHS configuration settings via the PHS web server. In a non-limiting example, the User's master password Formula is distinct and unique from those Formulas used for their TPV Site authentication. In this example, the User's master password Formula defines a dynamic information source that is unique to the master password Formula (i.e., different from any used for their TPV site Formulas.) And the master password Formula may include different Formula rules or rule sequences to further separate the constructed master password from any that might be constructed with a TPV Site Formula. Additionally, the user's master password Formula may include a unique hopping schedule different from any used for TPV Site Formulas. The multiple dimensions (information Source, Formula, and Schedule) of uniqueness of the master password Formula strengthen the security of the master password.

In an embodiment, the PHS provides for automated construction of customized passwords according to a hopping algorithm created by a User and known only to the User and the Algorithm Server. This automated construction repeatedly customizes user passwords according to a Formula by combining and altering the dynamic information by means of Formula rules. A Formula rule constructs or transforms a part of a password. In a non-limiting example, multiple Formula rules specify multiple parts of a hopped password or specify the order in which the parts are assembled into a single password. Formula rules may identify one or more time-variable data character strings from one or more information sources. Formula rules may also include one or more specific non-variable (fixed) character strings added to the Formula (increasing password entropy). Formula rules may also define the substitution, transformation, addition, subtraction, concatenation of the time-variable data or apply other similar methods to the time-variable data (such as reversing the spelling order). In a non-limiting example, another Formula rule might specify the prepending or appending fixed, personalized, character strings to the dynamic character strings, whether the dynamic character strings are altered or unaltered, obtained from dynamic information sources. In non-limiting example, another Formula rule may construct an easily remembered "site tag" in the password character string to indicate the TPV site at which the password is used and to construct unique passwords for each site using a single Formula, and thus avoiding the brushfire vulnerability present with many passwords.

In an embodiment, a Formula rule may include specifying the order in which Formula rules are applied in password construction resulting in greater variability of passwords from a single set of Formula rules. And yet another Formula rule may further specify the order of the various password parts constructed from other Formula rules of the password, such as those parts constructed from the non-limiting rules previously described. For example, the altered or unaltered dynamic string parts and any fixed string parts, such as a user secret word, or site tag, may be arranged in a variety of serial order.

In an exemplary embodiment, automated collection and storage of dynamic source information by the Algorithm Server may proceed according to a schedule, such as storing a copy of dynamic source information at a specific time, such as a news headline captured on a timed interval. In this embodiment, the automated retrieval and storage of dynamic source information may be obtained at scheduled times specified by a User defined hopping Schedule. In an embodiment, the automated retrieval and storage of dynamic source information by the Algorithm Server may also be scheduled by the source of dynamic information, such as when news headlines are updated or refreshed or an email newsletter is sent and received in an inbox, rather than user-specified. In non-limiting example, the automated retrieval and storage of dynamic source information by the Algorithm Server may also occur at the moment that a User logs in at a TPV web site. In a non-limiting example, this automated retrieval and storage may occur at the moment of authentication request. This is a non-limiting example of an "on-demand" hopping schedule determined by real-time user activity. In yet another non-limiting example, the automated storage of dynamic information may occur at times scheduled by the PHS, such as when it generates time-variable information such as an email newsletter, composed by the PHS, and sent to a User email inbox. This PHS-generated information may be created at times scheduled by the User defined hopping Schedule.

In an exemplary embodiment, the User may obtain new or recent dynamic information from the specified information source and apply their Formula to construct their new password independently from the Algorithm Server. The Algorithm Server, operating automatically and independently, obtains the same dynamic information and performs the same password construction activities. The Algorithm Server and the User do not require intercommunication of a change in the password. No synchronization between the two is necessary. Both know the change based on the pre-configured Formula and hopping Schedule. In a non-limiting example, the PHS may provide timely electronic notification of dynamic information to the User at their request. Source information is hidden in plain sight in the notifications, as it would be in its original form. In an embodiment, notification methods include email or text messaging to mobile devices and provide users with a redundant means of locating the time-variable data used by their Formula.

In an exemplary embodiment, the PHS includes an API to simply, quickly, and securely authenticate users to their TPV account via the TPV web site login page. In this embodiment, the PHS, through its API, performs the role of a supplemental authentication service and controls specific Authentication Server-to-Algorithm Server communications during a User login session at the TPV web site. The API provides a secure interface to PHS servers for several user-initiated functions while they are at the TPV web site. In this embodiment, TPV Customers may register with the PHS "password as a service", create a User Formula and pair their TPV account, and login to their TPV customer account with the PHS. In this embodiment, the user may also add a TPV site to a User's PHS service account and pair the user's TPV site and TPV account with a User Formula, and they may upgrade their PHS service during the Add Site process if their current service lacks the capacity for additional TPV sites. In this embodiment, any account-Formula pairing occurs only once on initial authentication access and should include automatic forced password reset the next time the User logs in directly through the TPV Authentication Server. Because the User's old TPV account password remains stored in the TPV Authentication Server, it should not be used for authentication. Marking the account for password reset prevents a security vulnerability caused by leaving an old unused password in the Authentication Server.

In an embodiment, the PHS API conducts secure server-to-server data transactions between TPV servers and PHS servers acting mutually on behalf of all TPV Customers and the PHS service rather than operating as a supplemental authentication service to the TPV. In this embodiment, the PHS operates as a stand-alone, dedicated, "authentication as a service" solution for businesses, and the PHS becomes a replacement for the TPV Authentication Server. In this embodiment, the PHS completely eliminates all stored passwords while preserving other TPV customer account records within TPV servers, which significantly improves the access control and security for the TPV. This lowers the risk of exploitation for TPV customer records since no customer passwords exist to be hacked or stolen. In this embodiment, the PHS mitigates exposure to multiple security vulnerabilities, including: any poor TPV security practices that may exist, human error, negligence, accident, or intentional harm. As a stand-alone authentication service, the PHS bears the responsibility for complex security administration, configuration, patching, upgrades, and monitoring, and improves security for many TPVs because PHS operators and maintainers are professionals trained and equipped in information security.

In an embodiment, the PHS, via its API, operates as an "information security as a service" provider. In this embodiment, the Algorithm Server constructs unique work and personal passwords for TPV employees to prevent a TPV common security weakness. In a non-limiting example of this embodiment, the User may specify the same Formula but use a distinct dynamic information source to construct work passwords and a different dynamic information source to construct their personal passwords. Information sources for work accounts may include corporate email newsletters or other limited access sources that can be segregated for work purposes. In this embodiment, the PHS, via its API, may provide privileged access management to employees authorized for access to privileged areas of a closed network, where the closed network may consist of a business network. In a non-limiting example, the User may configure a single hopping algorithm such that Formula rules are applied serially and construct several passwords that are increasingly sophisticated for authentication with each elevation in the employee's network access privileges. In this embodiment, a non-limiting example is a Formula rule using time-variable data in the password that authenticates initial employee access to a business network, but elevated access to a restricted area of the network that requires use of a second Formula rule to add additional time-variable data to the password construction. The password containing both time-variable password parts authenticates the employee to a more restricted access area of the network.

Encryption of private data at rest is a common security standard. In most networks accessible to external users, the private data is contained in a database server and encryption may be applied in a variety of ways, such as the full database, database tables, database columns, or database rows. Typically, any encryption requires a key. initialization vectors and cryptographic ciphers to convert plain text information to cipher text. In an embodiment, the Algorithm Server may provide the time-variable parts of a User's hopped password to the PHS for transformation into a "seed" for creation of a symmetric encryption key. This transformation may use one of several available cryptographically secure pseudo-random number generators for encrypting their private data. Private data is that data either held by the PHS servers or by the TPV servers. In this embodiment, the PHS uniquely produces personalized encryption of user private data. Personalized encryption increases user privacy and information security because their protection is not reliant on system-level security policies or practices or a central master key, which if stolen or misused compromises the entire database in a variety of well-known ways. Rather the User privacy and information security are built on choices the User makes. In this embodiment, the PHS may combine the User seed with additional randomly generated characters, such as, in a non-limiting example, a PHS seed, to increase the entropy of the seed for the cryptographic key. In an embodiment, the Algorithm Server encrypts the combined User and PHS seeds and transmits them to the TPV Authentication Server via the PHS API. The TPV may then add additional characters, consisting of the TPV seed, to the received data to arrive at a final seed that generates the encryption key to encrypt/ decrypt user private data. For decryption, the key is based on seeds used in the prior login session because those were the seeds used for the encryption of the user private data. For encryption, the key is based on seeds used in the current login session. In this embodiment, the user private data can only be de-ciphered by a TPV during an online session where the User has been authenticated via the PHS—seeds for the key from the TPV, PHS, and the user are needed to reconstruct the key. This reduces the exposure of User private data in time and its access by others. The data is not accessible to TPV employees or their systems unless the User is logged through the PHS. The only time the TPV's API call to the PHS is recognized and acted upon is at the moment of User authentication to the TPV. And because the API must start with a User login, the PHS is unable to initiate the API activity independently. In this embodiment, the User conducts business with the TPV via the TPV servers, and when the session closes either by User logout or time-out, the User data within the TPV is encrypted and stored with a new secure cryptographic key. In this embodiment, all API communications are conducted and secured using Transport Layer Security (TLS) protocols. All generated key components are destroyed by both the TPV, which occurs at end of session, and the PHS, which occurs at end of authentication.

In an exemplary embodiment, the PHS includes an administrative service whereby the system configuration may be securely accessed and configured. Administrative services include configuration of server performance variables, performance monitoring, troubleshooting technical problems, data backup, system security, and user support.

Non-Limiting Examples

In a non-limiting example, the PHS may permit port hopping. Within the firewalls of private networks, servers utilize port assignments to identify where communications for various applications should occur. In one instantiation, a web server may communicate with a database server over a default application port, such as port 3306. But communications may occur over any of a large number of alternative selected ports that may be assigned for communication. Unauthorized intruders may be granted access through a firewall and then have the freedom to operate broadly on the other side. Applying the PHS invention, time-variable dynamic data may be converted to a port number and used to hop ports for server-to-server interactions. When hopping is frequent, the communications port of a destination server with valuable information is difficult to locate and traffic analysis is also greatly impeded.

In an alternative non-limiting example, the PHS may permit Filename Hopping. With an application such as a database server, there is much valuable information that unauthorized intruders would attempt to exfiltrate from a private network. These files can be identified by meta-data such a filename, date, size. In a file name hopping instantiation, there are many duplicates of the primary file. All duplicates are filled with scrambled information but have identical metadata except for the file name. The PHS invention hops file names and knows which file is the original or authentic file containing valuable data. The probability that an intruder can select the correct file on the first attempt is the inverse ratio of the number of files duplicated.

In an alternative non-limiting example, the PHS may permit Credit Card CVV Hopping and/or Debit Card PIN Hopping. The PHS innovation may be applied to credit or debit card CVV codes or PINs, replacing the static codes with a dynamic number sequence that is converted from the User's time-variable password part(s) or using a number string, such as, in a non-limiting example, the market price of a stock index, as the time-variable source information.

In an alternative embodiment, the PHS may provide password hopping for Internet-of-Things (IoT) devices. Most all IoT devices include firmware that controls their configuration and operating parameters. Access to the firmware is secured with a static password. In this embodiment, the PHS, triggered by the elapsed time interval, may initiate a password hop within the IoT device by constructing a new hopped password. In a non-limiting example, the PHS may access and authenticate itself to the network hosting the IoT device. The authentication may or may not be by means of password hopping, and the authentication may or may not occur using a robotic script to submit authentication data to the network authentication server in substitution for a User. Once network access is granted, the PHS locates the IoT device with pre-configured location data, logs in to the IoT device with the prior password, which may be an expired hopped password constructed from the Formula, changes the IoT device password to the current hopped password, and then logs out of the IoT device and network. In a non-limiting example, this embodiment may be used by a home owner to secure their IoT devices connected to the Internet through their home local area network, In an alternative embodiment, the PHS may provide a time-variant initial seed for Cryptographic methods. Cryptographic algorithms generally use a random number generator as a key for the encryption. But all random number generators require a "seed" value on which to apply the generator. The PHS invention may be used to create the initial seed value used for random number generation.

Figure 2:
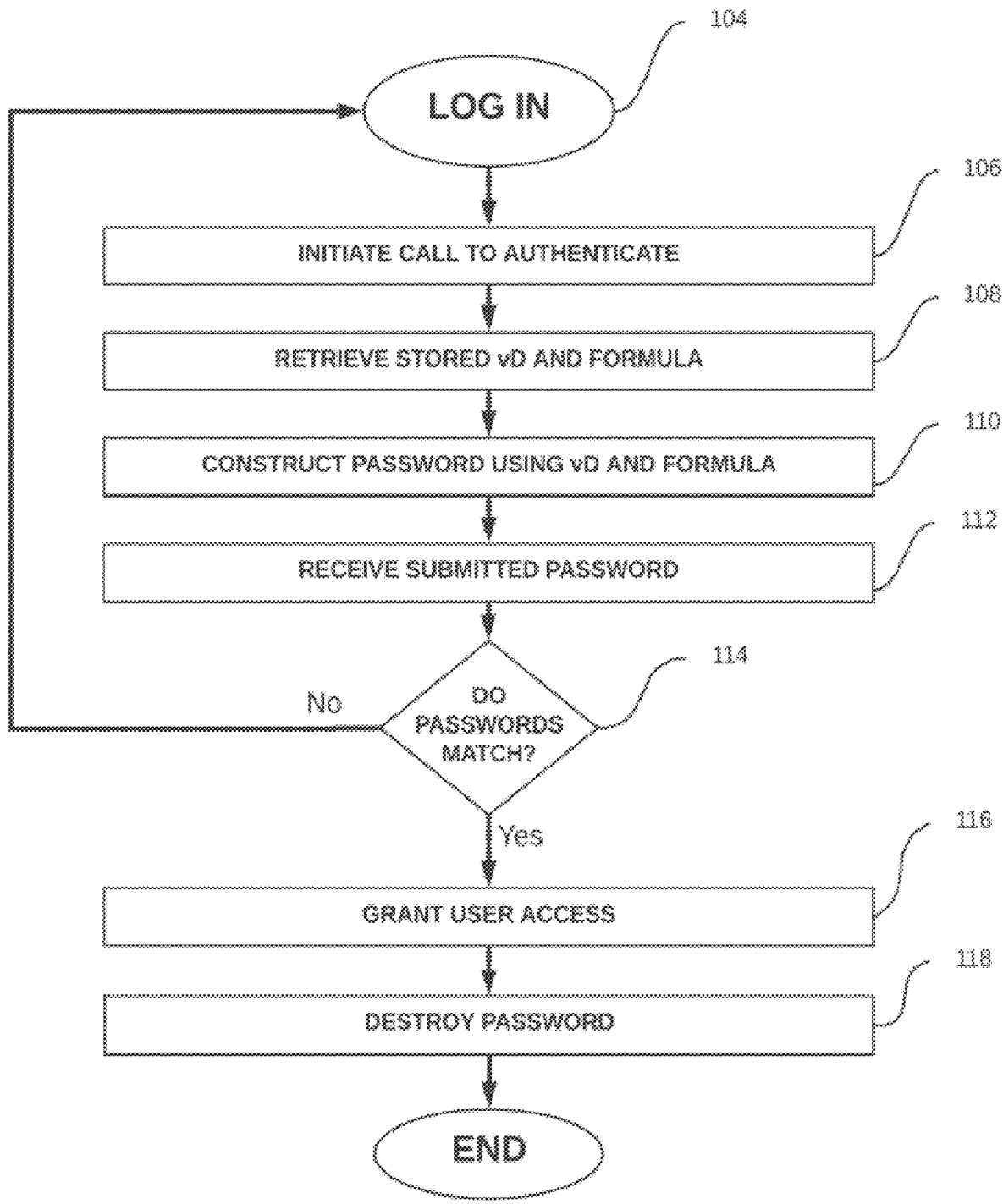
FIG. 2 is a process flow diagram for the password creation and communication of the same by an Algorithm Server to an Authentication Server consistent with certain embodiments of the present invention.

Turning now to FIGS. 1 and 2 these figure presents a process flow diagram for password construction and authentication of the same by an Algorithm Server communicating with a TPV Web Server consistent with certain embodiments of the present invention. FIG. 1 is a process flow which occurs at specified times, whereas FIG. 2 is a process flow which occurs at login or authentication of a hopped password. Turning now to FIG. 1, at 100, the Algorithm Server determines if the specified time interval has elapsed. If the specified time interval has not elapsed, the hopping algorithm is not activated and the source information used for a "hopped" password is not changed to a value different than the value previously known to the User. The process then terminates without "hopping" or modifying the stored time-variable data essential to password construction.

In an embodiment, if the time interval (i) has elapsed, at 102 the Algorithm Server collects and stores the time-variable data (vD) from the specified source. The vD is located at the specified coordinate position of the dynamic data source.

Turning now to FIG. 2, in an embodiment, at 104 a log in (authentication) is triggered at a TPV Web Server, which initiates an API call at 106 to authenticate the visitor's login credentials. At 108 the Algorithm Server retrieves the stored vD and specified Formula. At 110 the Algorithm Server applies the User-specified Formula to transform the vD and construct an authentic password. At 112 the Algorithm Server receives the submitted password. At 114 the Algorithm Server compares the submitted password to the constructed authentic password. If the passwords match, the User is granted access to the TPV services at 116. If the passwords do not match the User may submit another password. At 118 the Algorithm Server destroys the password without saving.

Figure 3:
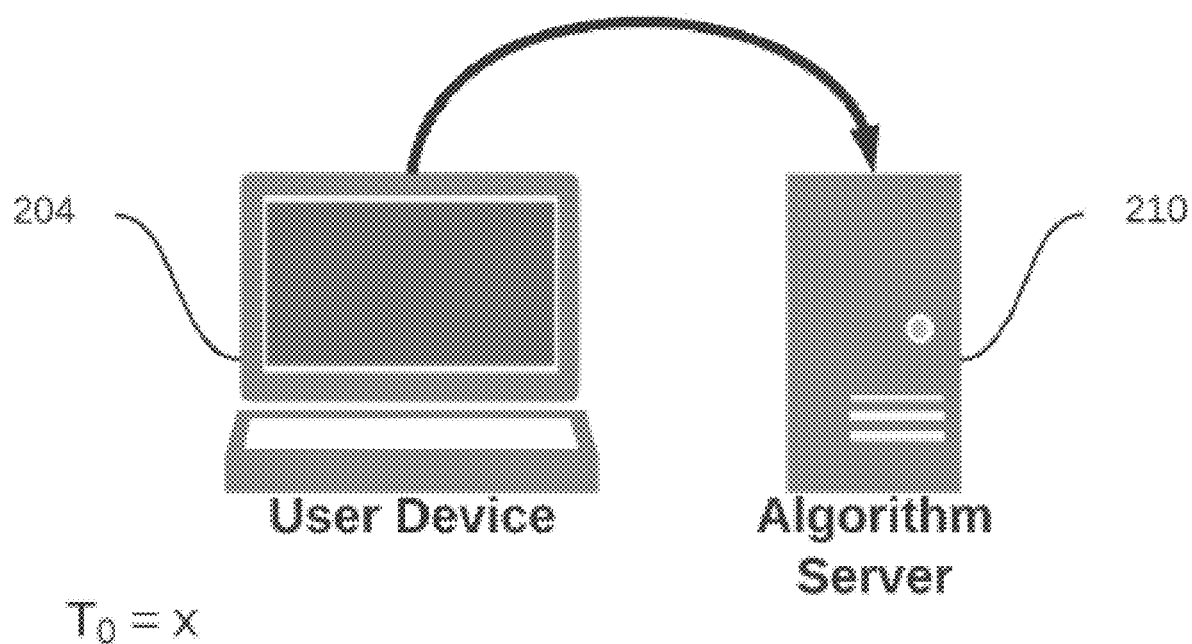
FIG. 3 is a system diagram describing communication at time $T_0$ between a user's device and an Algorithm Server consistent with certain embodiments of the present invention.

Turning now to FIG. 3, this figure represents a system diagram describing communication at an initial time $T_0$, between a user's Device and an Algorithm Server consistent with certain embodiments of the present invention. In an embodiment, rather than performing the hopping actions manually, a User may configure an Algorithm Server to automatically perform the password hopping activity. At time $T_0$, User's Device 204 communicates Formula rules to an Algorithm Server 210. The Algorithm Server stores the Formula rules, in combination with any user-specified data associated with the Formula rules, such as non-variable data that may be utilized in the hopping rules configured by the user.

The User's Device also communicates the DNS names of TPV sites where they have accounts, associated account details, and a schedule for when the time-variable passwords are to be hopped. When User configurations settings are submitted, the Algorithm Server begins to monitor and track the timing interval configured for use as the hopping frequency.

Figure 4:
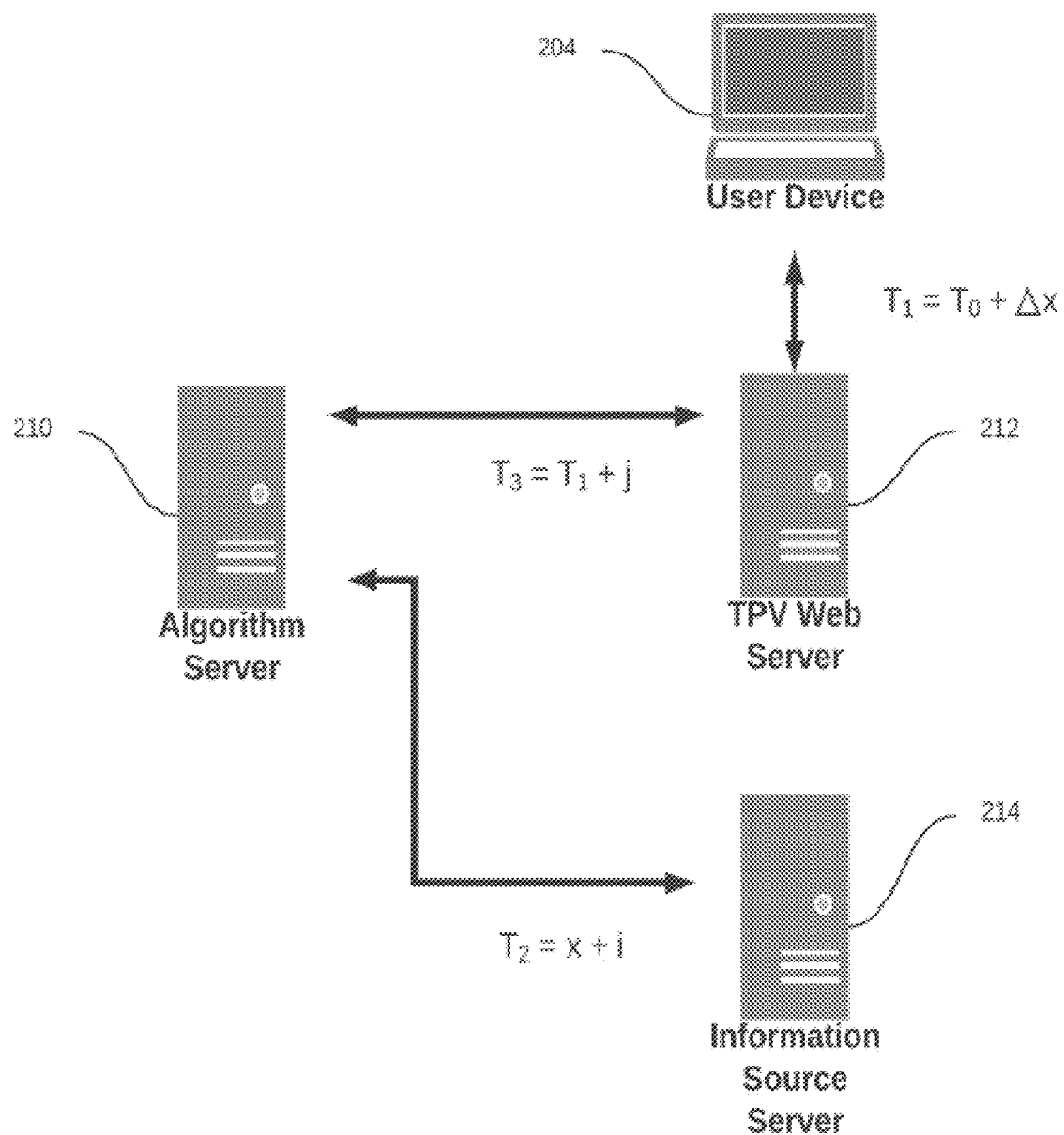
FIG. 4 is a system diagram describing communication at time $T_1$ between an Algorithm Server and Authentication Servers consistent with certain embodiments of the present invention.

Turning now to FIG. 4, this figure presents a system diagram describing communication at time $T_1$ between a User Device 204 and a TPV Web Server 212, and communication at time $T_2$ between an Algorithm Server 210 and an Information Source Server 214, and communication at time $T_3$ between a TPV Web Server 212 and an Algorithm Server 210 with certain embodiments of the present invention. In an embodiment, the Algorithm Server 210 monitors the time and User hopping algorithm to determine if a password hop is required. At time $T_2$, the Algorithm Server 210 connects to a specified Information Source Server 214, and obtains time-variable data and stores it. Time $T_2$ is equal to time $T_0$ plus the specified time interval. At an unknowable time $T_1$ User Device 204 connects to TPV Web Server 212 to log in to their account. At time $T_3$ TPV Web Server 212 connects to Algorithm Server 210 with authentication request. The Algorithm Server 210 recalls stored time-variable data and applies user Formula rules, constructs an authentic password and compares it to the one received from the User Device 204. The Algorithm Server either communicates failure or success to the TPV Web Server. If authenticated, the User Device is granted access to the User account on the TPV Web Server. The Algorithm Server receives final communication from the TPV Web Server and destroys the hopped password. Time $T_3$ is equal to time $T_1$ plus a very small time interval (j).

Figure 5:
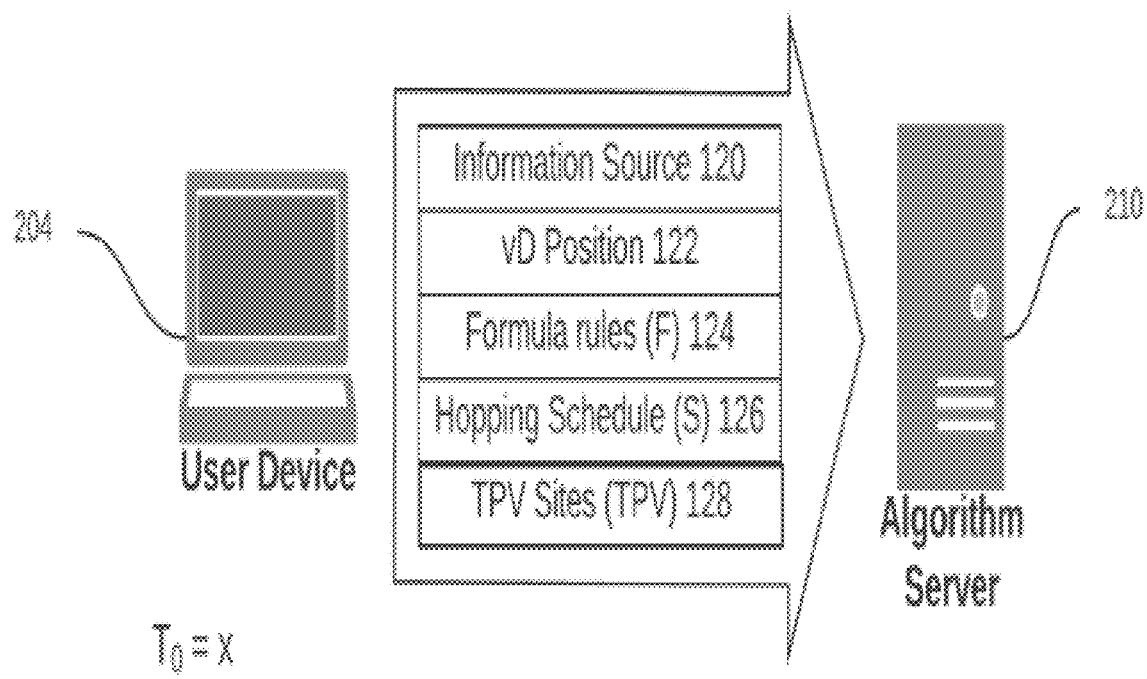
FIG. 5 is a system diagram describing the content of communication at time $T_0$ between user's device and an Algorithm Server consistent with certain embodiments of the present invention.

Turning now to FIG. 5, this figure presents a system diagram describing the content of communication at time $T_0$ between user's Device 204 and an Algorithm Server 210 consistent with certain embodiments of the present invention. In an embodiment, utilizing either the manual method involving the user or initiating the automatic hopping algorithm operational at the Algorithm Server at the direction of user, the hopping algorithm is codified in an Information Source 120, a coordinate position for dynamic data 122, a Formula with one or more Formula rules 124, and a hopping Schedule composed at least of time interval, and/or a selected date and time 126. At time $T_0$, user's Device 204 communicates the following to the Algorithm Server 210: a Source 120, such as a dynamic news website, a coordinate position for time-variable data (vD) 122 (e.g.: the third word of the second news story on the user-specified website home page), a Formula (F) comprised of one or more rules 124, a specified Hopping Schedule (S) 126, and the domain names for one or more TPV web sites 128. Upon communicating this information to the Algorithm server 210, the system encrypts and stores the incoming data until such time that the elapsed time requires collection of vD or until such time as a TPV Web Server calls for authentication of a User.

Figure 6:
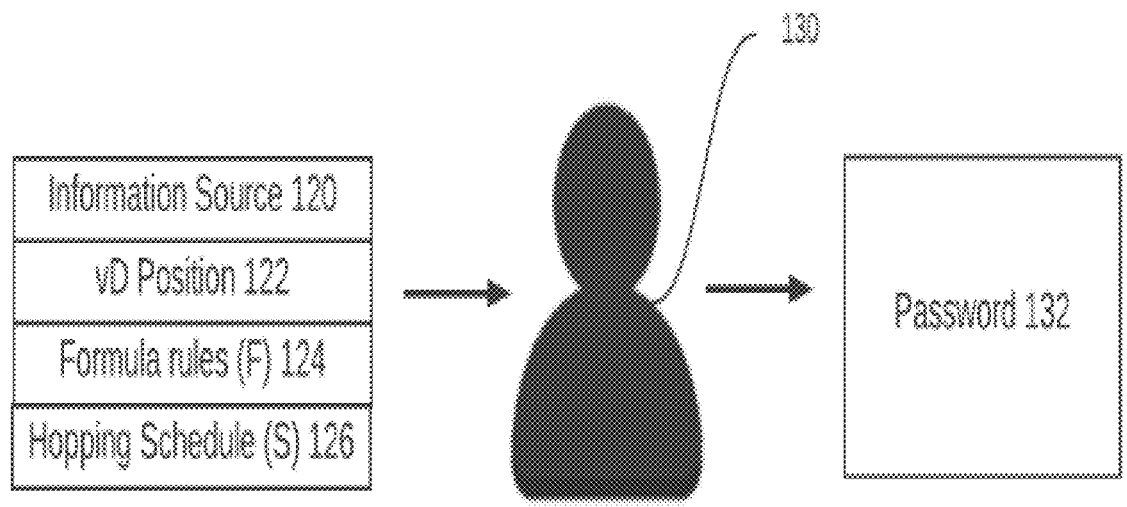
FIG. 6 is a system diagram describing the retrieval of the current user's password consistent with certain embodiments of the present invention.

Turning now to FIG. 6, this figure presents a system diagram describing the User's construction of their current password at time $T_1$ consistent with certain embodiments of the present invention. In an embodiment, at any time user wishes to log in to a TPV web site, a User 130 may read the information source 120 and identify time-variable data at a specified position 122 and during the current time interval 126. The User applies the specified Formula 124 to vD and constructs the present password 132. Due to the fact that one or many hop time intervals may have elapsed since the last time that the user authenticated, the user must provide certain correct information to the Authentication Server to pass the authentication test. Knowing the hopping schedule (S) (time interval) 126, User 130 references the specific data position 122 associated both with the pre-configured Formula rules and the Schedule on source 120 to discover the time-variable data specified for use in the construction of the password for each hop cycle. The user 130 further applies additional actions that may be required by the Formula including, in a non-limiting example, any transform rules and any non-variable character string rules that may have been included in the pre-configured Formula and may be required in the construction of the current password 132. The User may then submit the current password for authentication regardless of the number of hop time intervals that may have elapsed since the last time the user authenticated with a TPV web site.

Figure 7:
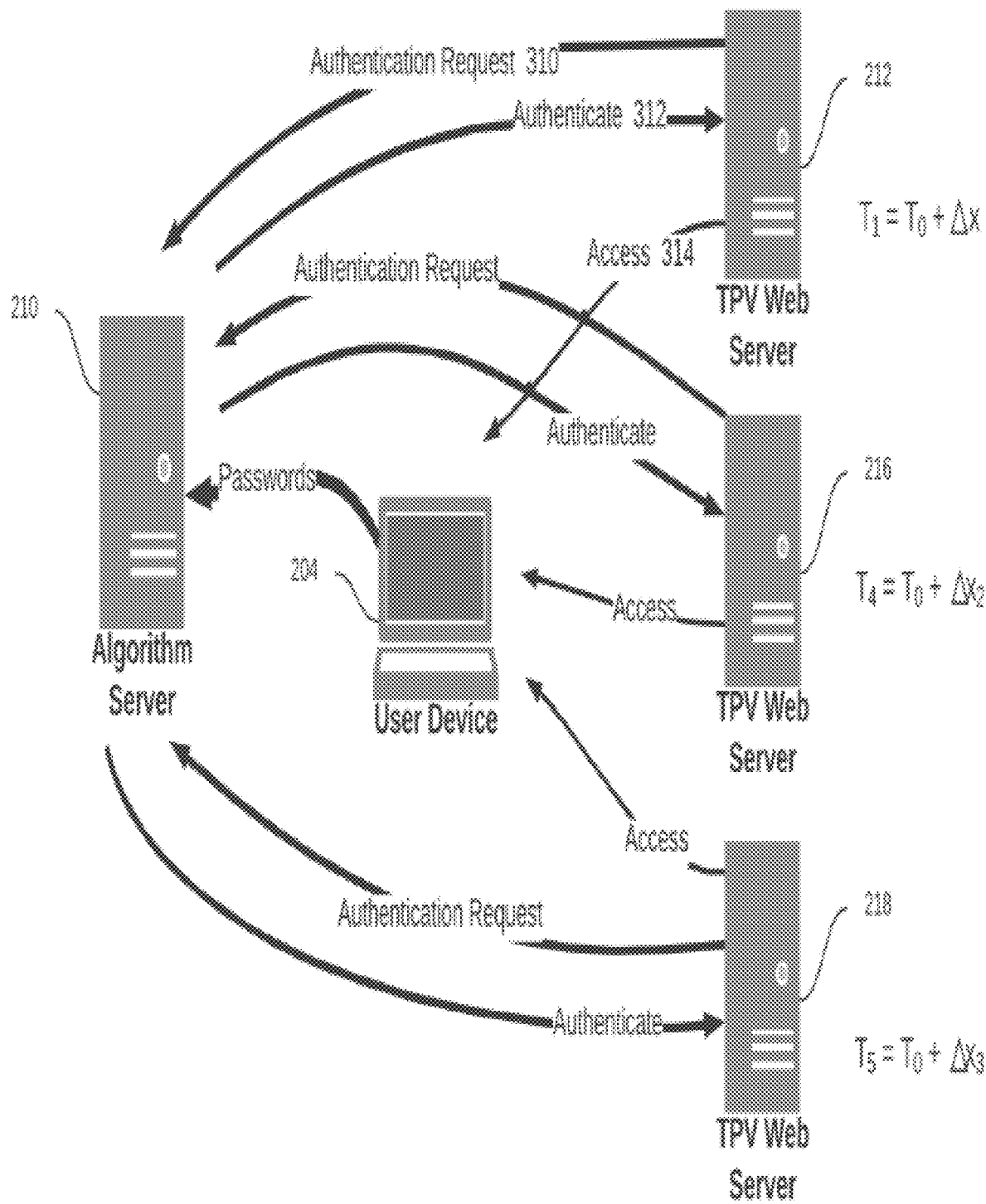
FIG. 7 is a system diagram describing communication of user's password to Authentication servers consistent with certain embodiments of the present invention.

Turning now to FIG. 7, this figure presents a system diagram describing User authentication to a variety of TPV Web Servers at various times consistent with certain embodiments of the present invention. In an embodiment, the User, utilizing the latest hopped password to access the private content of a TPV Web Server 212 initiates authentication via User's Device 204 at time $T_1$. The TPV Web Server 212 requests authentication 310 from the Algorithm Server 210 and facilitates a connection to the User Device. The User submits their hopped password (constructed for the current time interval per their specified Formula paired with the TPV web site.) The Algorithm Server 210 constructs the authentic password using the particular specified Source and Formula (paired to the particular TPV web site and user account). If the User-communicated password is authenticated (matched with the authentic constructed password) the TPV Algorithm Server authenticates 312 the User to the TPV Web Server 212. The TPV Web Server grants access 314 to the User Device. In an embodiment, The User may specify different Sources and Formulas for pairing with different TPV web sites and may also specify different hopping Schedules, composed of time intervals and/or pre-specified dates and times, for different TPV web sites. In an embodiment, the Algorithm Server authenticates the User to a plurality of TPV Web Servers 216, and 218 at times $T_4$ and $T_5$, respectively, with a plurality of paired Sources, Formulas, and hopping Schedules to grant access to User private data. And times $T_1$, $T_4$, and $T_5$ may or may not occur during the same time hopping interval (i).

Figure 8:
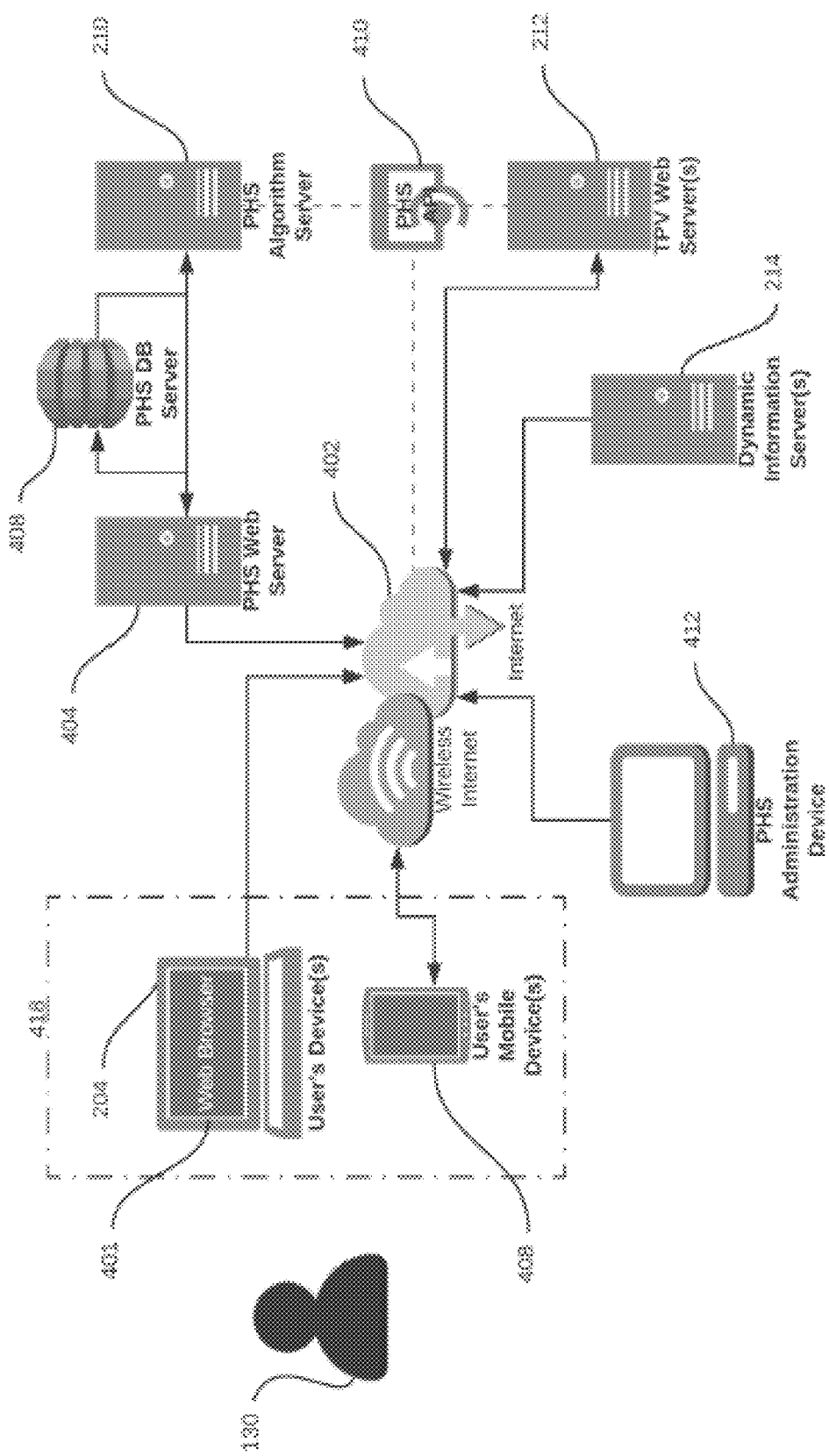
FIG. 8 illustrates the major components of the Password Hopping System

Turning now to FIG. 8, this figure presents the major components of the Password Hopping System and external component dependencies. In an embodiment, the PHS is predominantly a software application with supporting hardware components. In the current instantiation, the PHS software is a web application 401 that operates from within a web browser and is hosted across multiple servers connected to the Internet 402. In an embodiment, the PHS system software may be hosted on a PHS Web Server 404 in communication with a PHS Algorithm Server 210. But other possible instantiations include a mobile application implemented on a user mobile device 408, such as an iOS or Android application, a stand-alone computer application, such as, in a non-limiting example, an application that might be used on a home network to hop passwords for IoT device access, or a daemon, such as might be used inside a network center to hop ports between network servers. In the current instantiation, the PHS includes a web server 404, a database server 408, an Algorithm Server 210, an Application Programming Interface (API) 410, and an administration device 412. The PHS also includes a plurality of Users 130 and User devices (mobile or otherwise) 418, and a plurality of TPV web servers 212, and a plurality of servers hosting dynamic information sources 214.

In an embodiment, in addition to the various computing resources that comprise the PHS implementation, the PHS requires a time-variable information Source, a specified Formula, and a user- or source-specified hopping Schedule as inputs to the hopping algorithm. The output of the PHS is a plurality of passwords constructed and replaced automatically according to pre-configured hopping Schedules.

Figure 9:
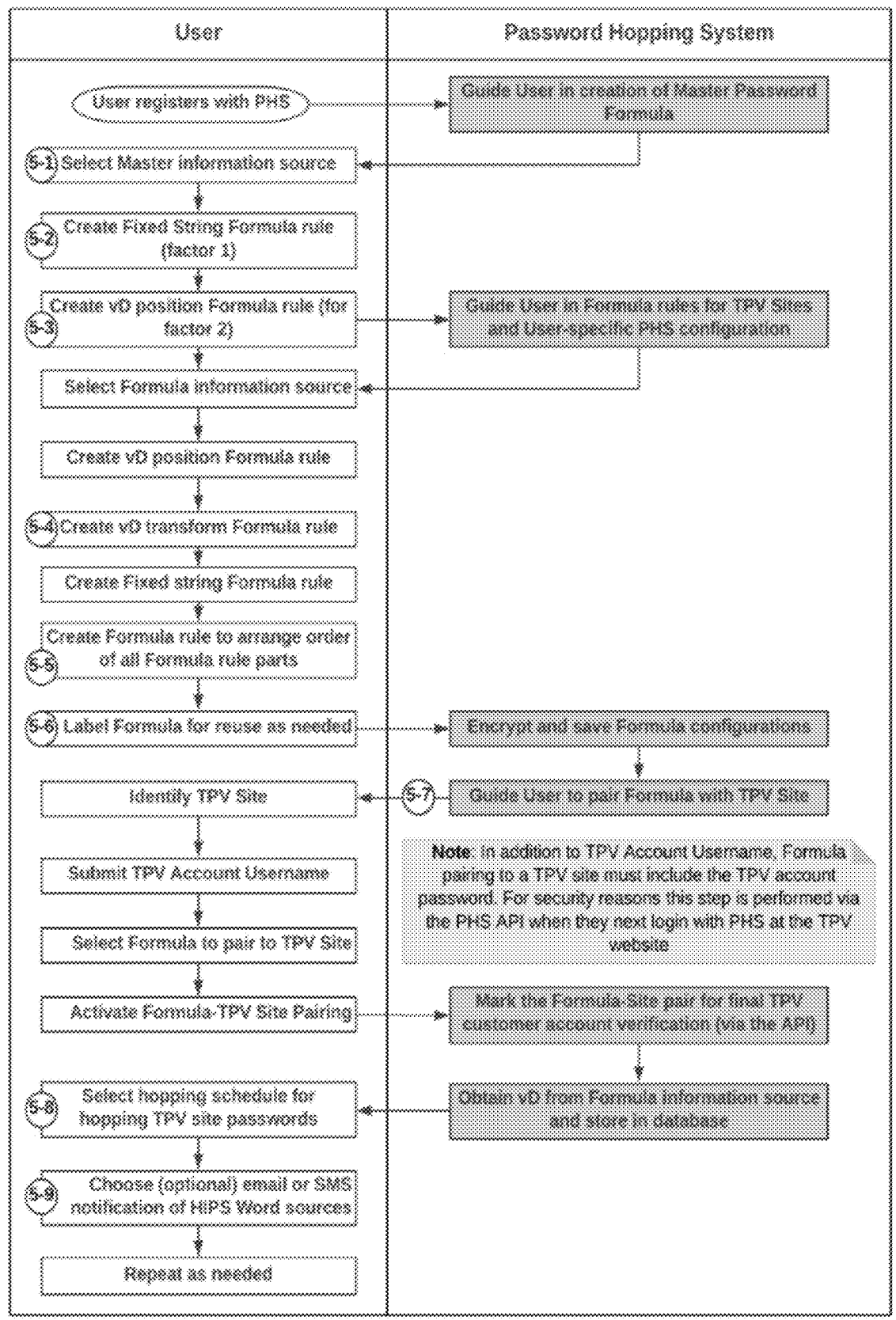
FIG. 9 illustrates that PHS Web and Database Servers provide user interfaces for User configuration of hopping algorithm including, but not limited to, Formula(s), Hopping Schedule(s), and any optional notifications.

Turning now to FIG. 9, this figure illustrates that the PHS provides user interfaces for guided User configuration of user-specific operating parameters. Following a series of guided activities, Users create password Formulas, pair their Formulas with specific TPV sites, schedule the timing of password hops (changes), and configure notifications.

These steps include but are not limited to the following:

At 5-1, User creates a master password Formula to construct hopped master passwords for user access to their PHS data such as, but not limited to, hopping algorithms, Sources, Formulas, rules, Sites, and notifications. In an embodiment The Master Password Formula uses an information source that is isolated from information sources used in other TPV site Formulas. The source must present dynamic information that changes at least as frequently as the scheduled time interval for password hopping.

At 5-2, a fixed character string is collected from the User, encrypted, and stored. The fixed string represents the first factor in 2-factor authentication.

At 5-3, the position of one or more variable character strings (vD) within the Source is identified by the User. In a non-limiting example, for a news web page the character string selected might be defined by a headline position and the position of a word in the headline, such as first headline, first word.

At 5-4, because a single word may be too short to provide strong security (i.e., words such as "and", or "the") even for a short hopping time interval, the User may define a Formula rule to transform the vD and increase its entropy and reduce its guessability for greater security without compromising its simplicity. In a non-limiting example, transformations include changing selected lowercase letters to uppercase, changing selected letters to numbers, adding special characters, adding numbers, and other transformations that include appending, prepending, adding, subtracting, substituting, tagging, or similar alterations on a character-by-character level.

At 5-5, because a Formula constructs replaceable and disposable passwords using a series of multiple Formula rules, and each rule produces or alters a part of a hopped password, the multiple parts may be composed of fixed strings and one or more dynamic strings. in a non-limiting example, a Formula arrangement rule allows the User to arrange order of the password parts constructed from other Formula rules.

At 5-6, the User's Formula is labeled for easy reference and reuse by the User when Formulas are paired with TPV web sites.

At 5-7, a User's Formula is paired, or coupled, with the User account at a TPV web site. Pairing defines which User Formula to apply when a hopped password is constructed and ensures that a specific User account at a TPV site is authenticated by the Algorithm Server Pairing a Formula to a TPV Site and User account includes identifying the TPV site, obtaining the User login name (e.g., email address) and the User account password (the static password stored by the TPV). For security reasons, the User account password is only submitted by the User to the TPV (it is never received by the PHS) at their first login after initiating a Formula-site pairing. The User also identifies the Formula to pair and activates the pairing, which begins the password hopping activity for that TPV Site.

At 5-8, a hopping schedule, composed of a time interval and/or a date and time, is specified by the User. Hopping may occur at User-selected time intervals, or by conditional changes with the information source, or on-demand such as at the time of authentication by a User at a TPV site.

At 5-9, The Algorithm Server never communicates hopped passwords. But it may, at the request of a User, provide a notification of the current information source to the User when a password hop occurs. Notifications, such as an email or text message, contain the source information, such as a news story headline, necessary for constructing the hopped password and assist them in constructing their hopped password using their remembered Formula. For security reasons the notification includes multiple versions of source information of which one is the correct source for the User Formula.

Figure 10:
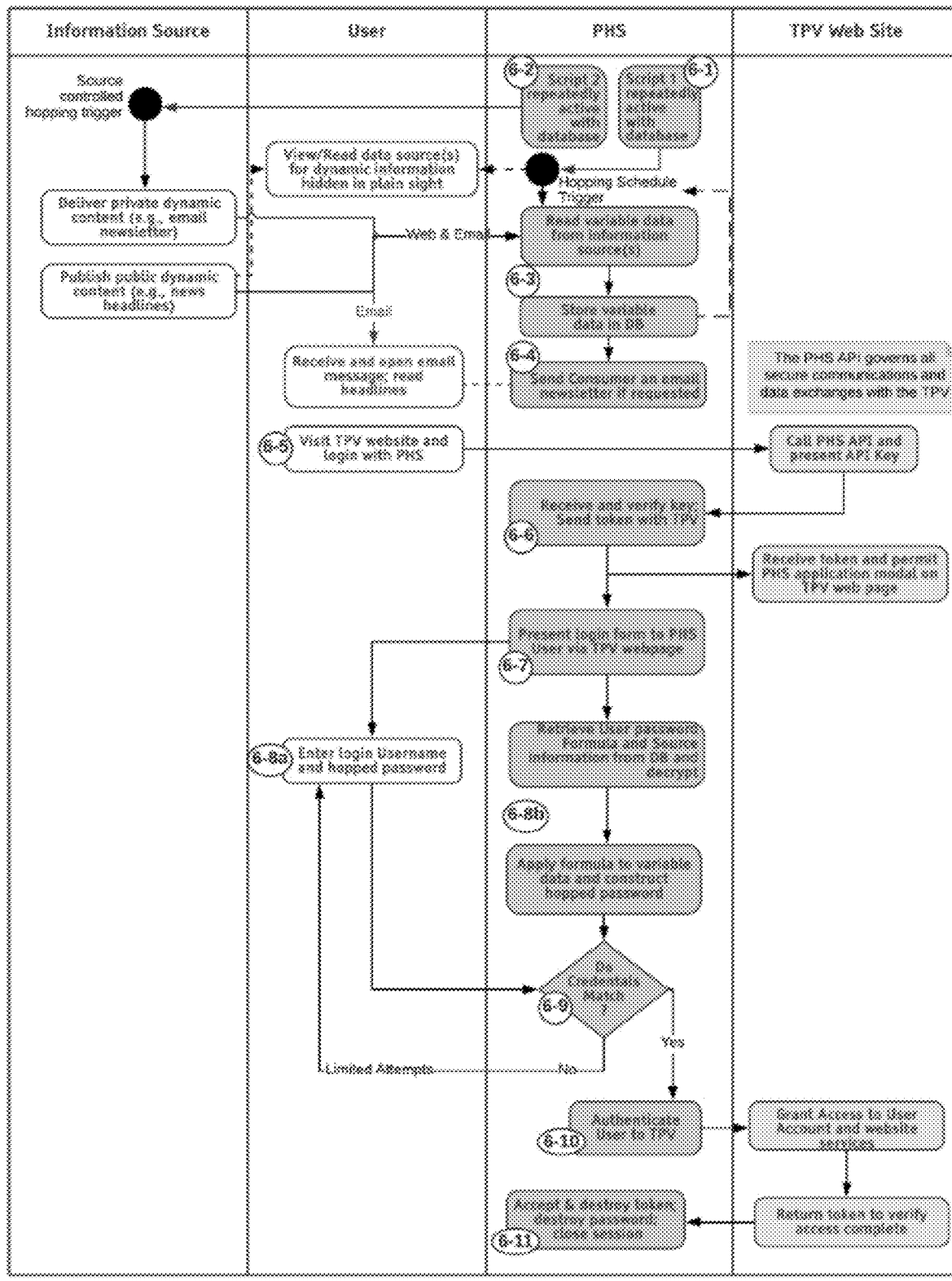
FIG. 10 illustrates functions of the Password Hopping System (in a web application instantiation) for authentication of User accounts at a third-party website

Turning now to FIG. 10, this figure illustrates the functions of the PHS in the exemplary embodiment of a web application for authentication of User accounts at a TPV web site after User-specific configuration of the Algorithm Server is completed. At this point, the User and the Algorithm Server agree on how a password will be constructed and the TPV Site where it will be used. A script 6-1 within the PHS is activated repeatedly at very short, time intervals. The script queries the PHS Database Server to identify and select User records whose hopping schedule matches the current time. When a record is found, the script initiates a password hop activity.

In an alternative embodiment, a password hop may be triggered by an external action or schedule rather than by a User-specified or system-specified time stored in the PHS Database Server. In this alternative embodiment, the password hop is triggered by a change in the vD source, such as, in a non-limiting example, a news headline update, or by receipt of new source information, such as, in a non-limiting example, an email newsletter arriving in an inbox. In this alternative embodiment, a second PHS script 6-2 is activated repeatedly at very short intervals, and the script queries the appropriate information source to detect vD changes. If the query returns "true", then a password hop is triggered.

In an exemplary embodiment, the trigger for a password hop initiates Algorithm Server activities to access, collect, and store 6-3 time-variable data from the User-specified information source. If the User configured the Algorithm Server to send courtesy notifications, the PHS provides a notification to the User 6-4. At Time $T_2$ the User initiates a login to a TPV web site that has previously integrated the PHS API and obtained their secret API Keys 6-5. The TPV Web Server activates the PHS API and calls the Algorithm Server for authentication of the User. The TPV Web Server call includes presentation of PHS API Keys which the PHS Authentication Server must verify 6-6. Tokens are exchanged between the two servers to permit PHS user interface modals to be presented to the User at the TPV web site, and the PHS presents its authentication form to the User 6-7. The user submits their TPV account username or email address and their current hopped password 6-8a. Concurrently, the Algorithm Server retrieves and decrypts the User stored data (Formula and time-variable data) and constructs the authentic password 6-8b. Upon receiving the User's submitted login credentials, the Algorithm Server compares them with the authentic credentials 6-9 and, if a match occurs, the PHS authenticates the User to the TPV web site 6-10. The TPV Web Server grants User access to their TPV account and returns tokens to the PHS to verify successful completion, at which time the PHS destroys API tokens, User password, and closes the session with the TPV 6-11.

Figure 11:
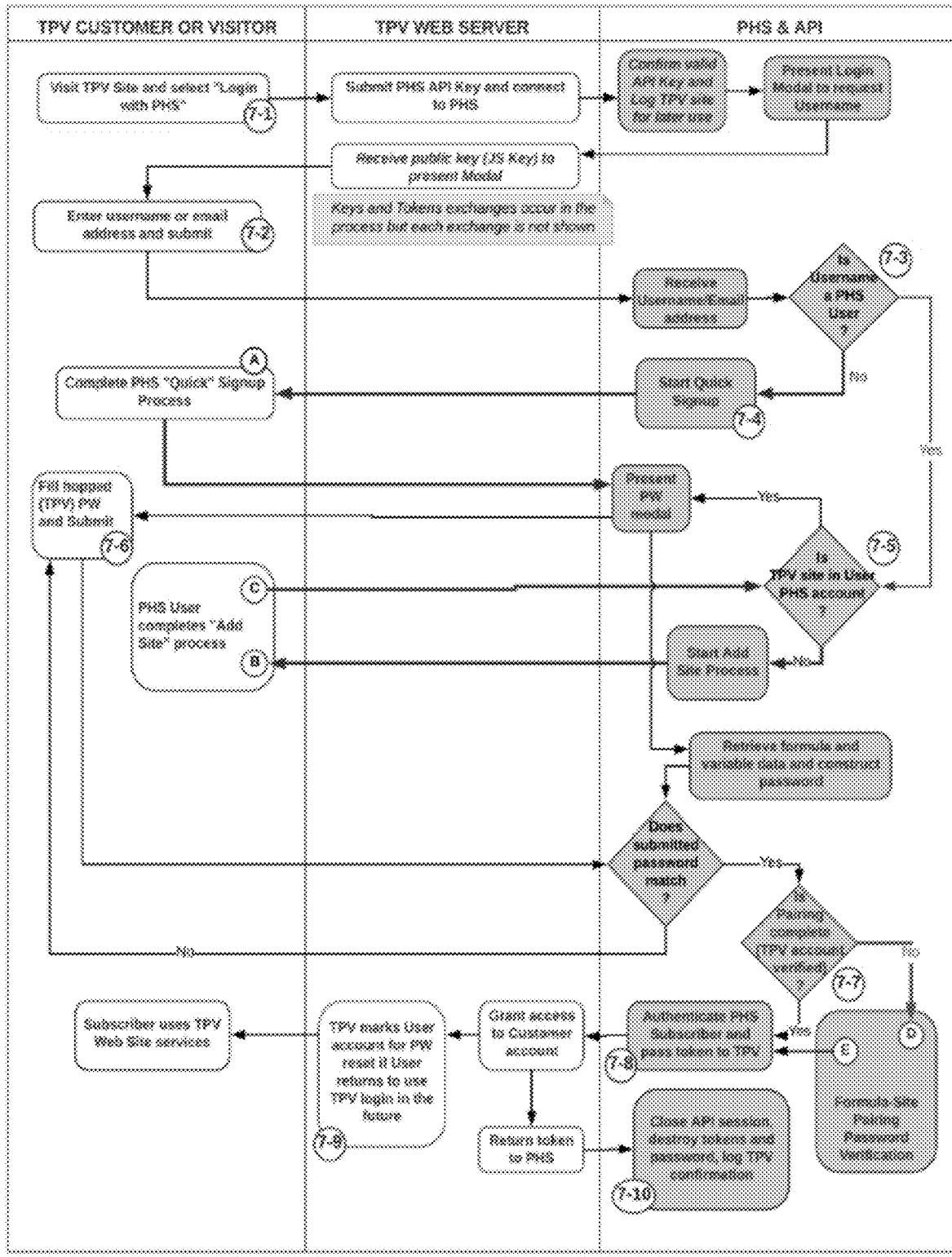
FIG. 11 illustrates that PHS Authentication is paired with verified Third Party Vendor (TPV) Customer accounts and several API branches may occur to provide Users additional system functions from a TPV website

Turning now to FIG. 11, this figure illustrates the PHS API functions and activities with the User and TPV Web Server at Time $T_2$. The activities include a one-time verification of User TPV account password by the TPV. This verification is the final step in the Formula-site pairing started by the User in their configuration of user-specific PHS services.

In an exemplary embodiment, a TPV hosts a website offering products, services, or information to authorized users. TPV customers that are authorized users have accounts and login credentials such as username, email address, and a password. The TPV may also have 'visitors', which are users without accounts, to their web site. Some of these visitors may or may not be Users of the PHS. The TPV also has accepted and integrated the PHS API on their web server and obtained API Keys from the PHS. The PHS API is an essential element of PHS operation and configuration and controls the communication and transfer of data between the TPV Web Server and the PHS, including replication of certain PHS User configuration functions such as adding and pairing a TPV web site to a User's PHS Formula, or upgrading their PHS services, or creating an TPV account.

In an exemplary embodiment, a TPV registers with the PHS and receives a unique API Key, Username, and Password Formula. The API controls four activities between the TPV and the PHS during a User login at a TPV web site:
1) authenticate a PHS User/TPV Customer to their TPV account at login;
2) add the TPV site to the User's PHS account and pair it with a User Formula
3) Upgrade PHS services if the User's service capacity has been reached.
3) Signup (create account) a TPV Customer with the PHS and pair their TPV account to a PHS Formula and hopping Schedule; and
4) Signup (create account) a TPV Visitor with the PHS, create a TPV account for them on the TPV site, and pair that account with their PHS Formula.

In an embodiment, in accordance with an API agreement, the TPV web server displays a "login with PHS" button on the TPV login page 7-1. TPV site visitors or TPV customers or PHS Users click the button and use the PHS to authenticate their access to their TPV account. When the "Login With PHS" button is used, the API loads I-Frames from the PHS web server onto the TPV pages. The content of the API I-Frames originates with the PHS Web Server, and any User interactions, such as in a non-limiting example, submit button clicks and data submission, occur with the PHS Web Server rather than the TPV web server. In an embodiment, the PHS receives API keys, provides security tokens, and provides a series of user interfaces (UIs) to collect the User's PHS username 7-1. The PHS determines if the User is currently registered with the PHS 7-3, and if not it serves the User with a series of I-Frames to guide the User through a signup process 'A', 7-4. If the User is registered with the PHS, the PHS tests if the TPV Site that the User is logging into is included in their PHS Formula-Site pairings 7-5. If the TPV Site in not in the User's Formula-site pairings, then a branche (B-C) of activities is initiated to add the site and pair a Formula (see FIG. 8) If the Site is in the User's Formula-site pairing list, the PHS requests, and the User submits, their hopped password 7-6 for authentication. If the User-submitted password matches the PHS-constructed authentic password, the PHS checks if the User TPV account has been fully verified or not 7-7. If Formula-site paring is not complete. The PHS initiates a branch (D-E) of activities to complete the Formula-site pairing with the User submission of their TPV account password to the TPV Web Server (see FIG. 11). If the Formula-site pairing is complete, then the PHS authenticates the User to the TPV Web Server 7-8. The PHS issues a "Reset PW" alert to the TPV so the TPV may replace the TPV User password in its database with a long randomly generated password and identify the User account for a password reset should the User return to using the TPV login system in the future 7-9. This ensures that an aging unused password does not remain within the TPV databases exposing the account to risk of breach and destroys tokens and password and closes the authentication session 7-10.

Figure 12:
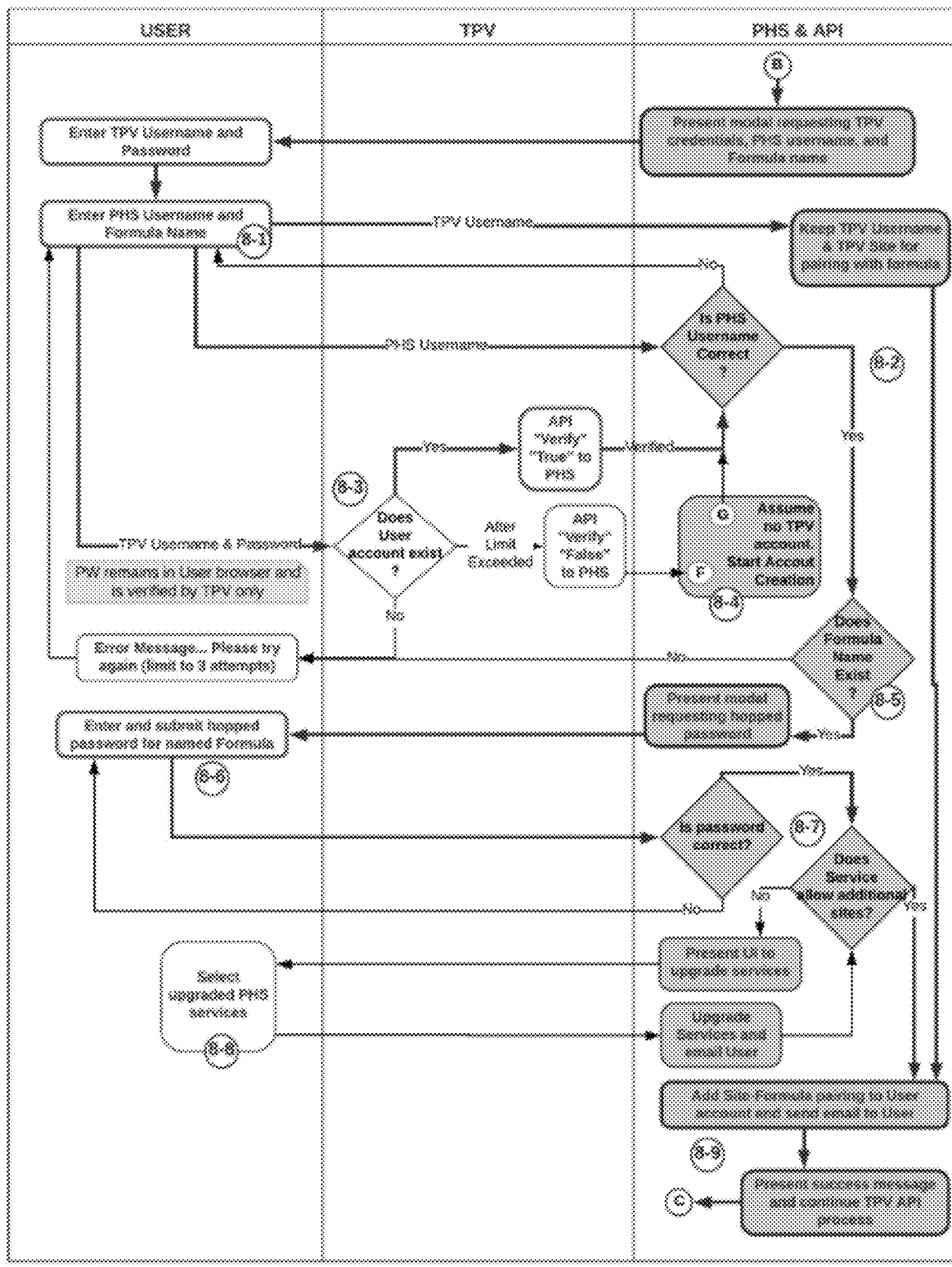
FIG. 12 illustrates that the PHS API includes a process branch to add (pair) a TPV website to a User Formula in the Algorithm Server

Turning now to FIG. 12, this figure illustrates the PHS API branch to add and pair a TPV web site to a User Formula in the PHS when the TPV Site is not presently listed and paired.

In an embodiment, the PHS requests the User/Customer's TPV Username or email and TPV Password and their PHS Username and Formula name for pairing with the TPV site 8-1. The TPV password may be used to ensure the PHS pairs uniquely with the User's TPV account. The User's PHS Username and the Formula name may be used to determine how to construct hopped passwords for the paired TPV site. The entered TPV Username is sent to the PHS where the PHS tests for a valid account 8-2. The entered TPV Password remains within the browser and is readable only by the TPV 8-3. If correct, the TPV verifies the account to the PHS. If not, then the PHS assumes a TPV user account does not exist and a branch (F-G) to create a TPV account is activated 8-4. If the PHS Username is valid, then the PHS tests the Formula name for existence or correctness 8-5. If the Formula name is valid, then the PHS requests the User submit the hopped password for the Formula 8-6. If the submitted hopped password is authentic, then the PHS tests the capacity of the User's service and confirms the User's services have capacity to add the TPV Site 8-7. If the User's service does not have capacity to add the TPV site, then the PHS presents user options to upgrade their service 8-8. If the User's service has capacity, then the Formula is paired with the TPV site and Customer account. The "add site" subprocess ends with a return to the API's main authentication process 8-9, previously described in FIG. 7.

Figure 13:
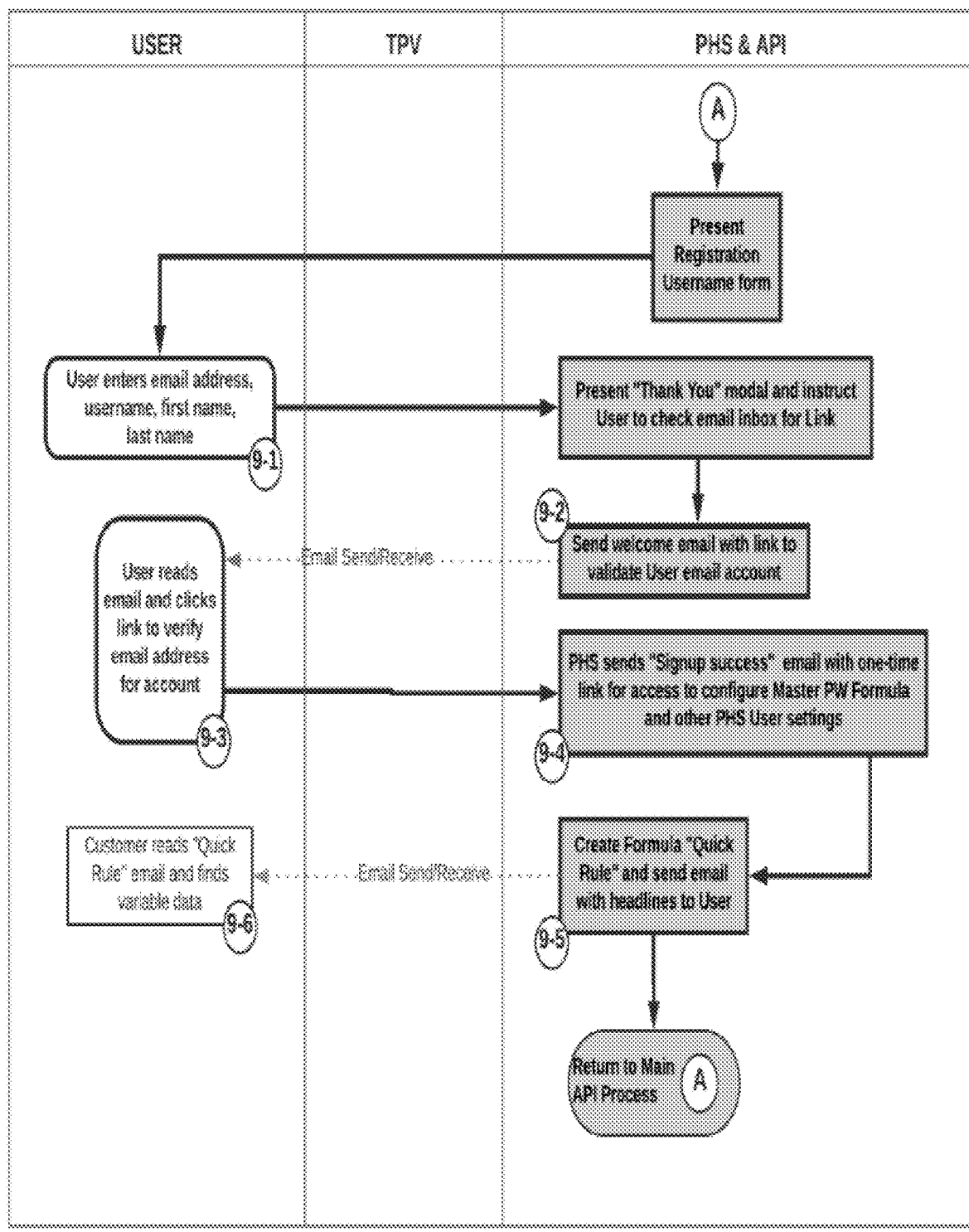
FIG. 13 illustrates that the PHS API includes a process branch for "quick signup" of TPV Customers who wish to use the PHS

Turning now to FIG. 13, this figure illustrates the PHS API process branch for "quick signup" of TPV Customers who wish to use the PHS. The PHS provides a series of I-Frames to sign up an existing TPV Customer as a temporary PHS User and to create a PHS account.

In an embodiment of this API process branch, TPV Customers (Users) who wish to use password hopping must first signup with the PHS and create an account. This process branch includes selection of a unique Username and creation of a Master Password Formula 9-1. The PHS then sends the Use an email to validate the submitted email address is correct (the email contains a link to the PHS which the User must click) 9-2. The User receives the email and clicks the link 9-3 and receives a second email with a one-time link to access a PHS form to configure their Master Formula 9-4. The PHS chooses an abbreviated Formula "quick rule" 9-5 and sends the rule and instructions to the User for use in later API processes 9-6, as previously described in FIG. 7.

Figure 14:
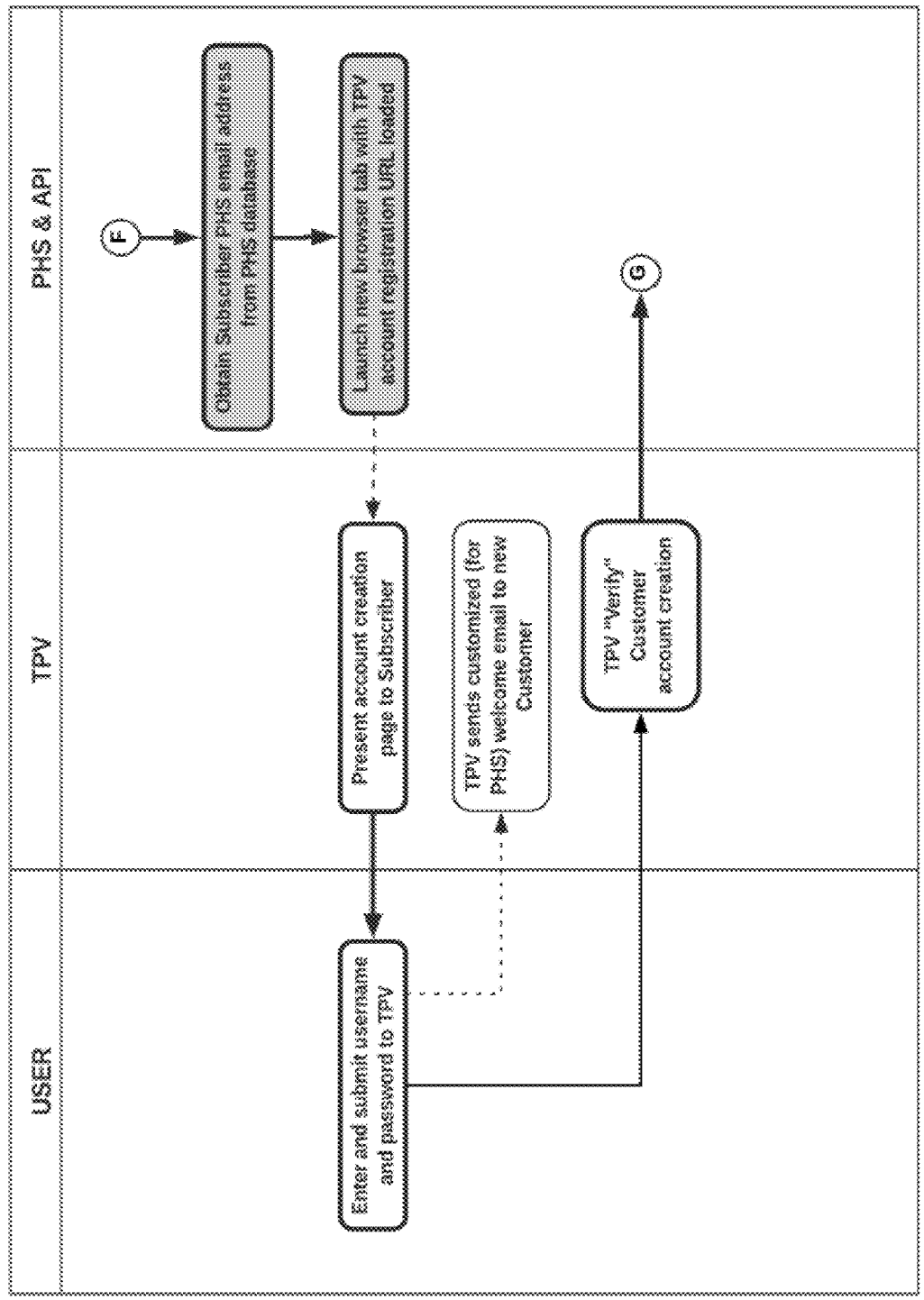
FIG. 14 illustrates that the PHS API includes a process branch to create a TPV account at the time of pairing if a TPV account does not yet exist

Turning now to FIG. 14, this figure illustrates the PHS API process branch to create a TPV account during API Formula-site pairing if a TPV account for the User cannot be verified by the TPV. In a non-limiting example, PHS assumes a TPV account does not yet exist for the user. The PHS provides a series of I-Frames to the User to create a TPV Customer account if one cannot be found. In this example, Formula-site pairing requires a TPV account.

In an embodiment, this API process branch is very similar to registering a TPV User with PHS, however in this instance there is not a TPV Customer account to match as part of the Formula-site pairing process. A User who is a TPV visitor may use the PHS API to signup, create a "quick formula", add the TPV site to their PHS service, and authenticate to the TPV web server.

Figure 15:
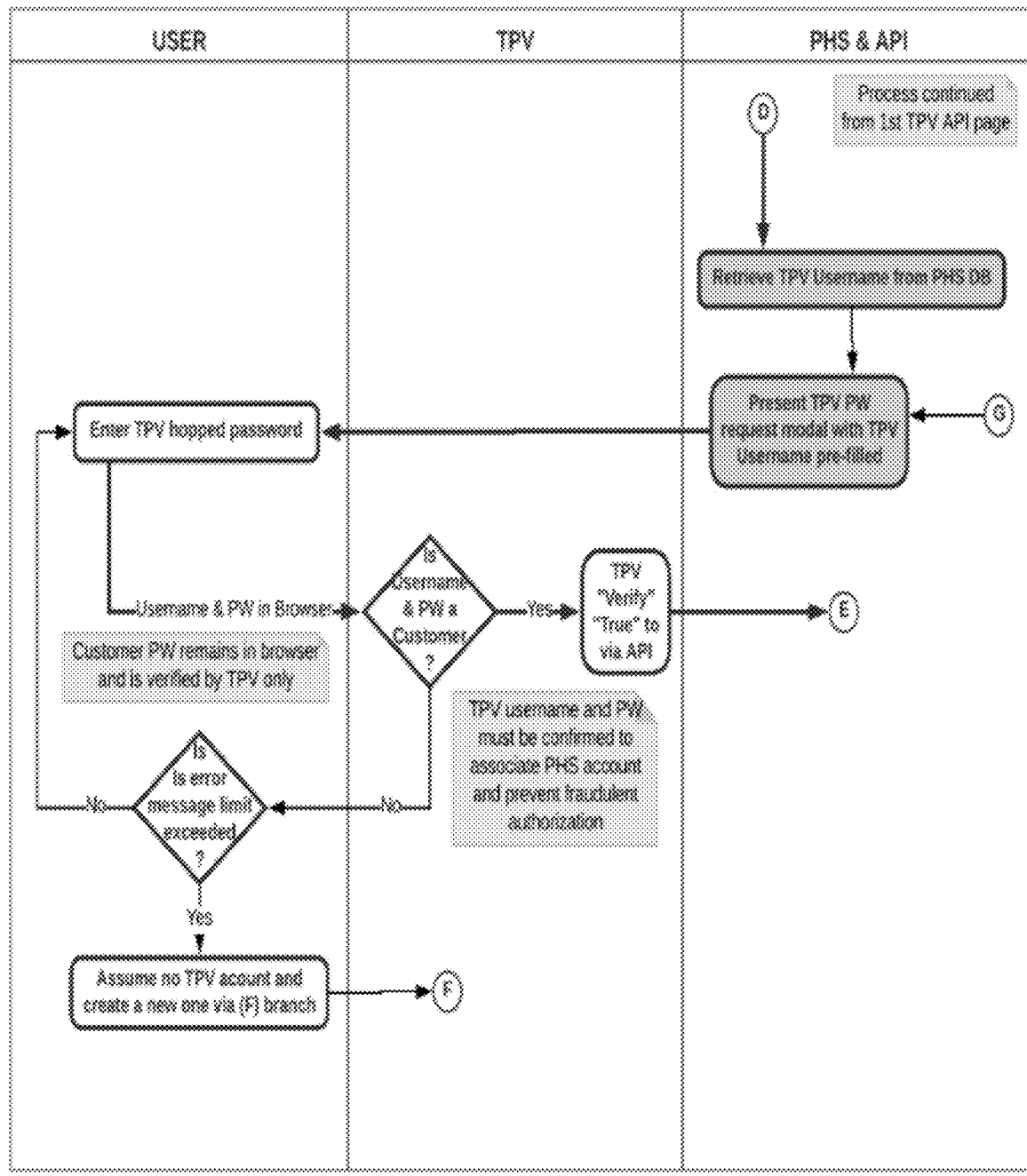
FIG. 15 illustrates that the PHS API provides final TPV account verification with the User's TPV account password and password hopping is fully configured

Turning now to FIG. 15, this figure presents the PHS API activity of final TPV account verification through the submission of the User's TPV account password in the PHS Formula-site pairing process, as described previously in FIG. 5. Although password hopping may have been activated earlier in time, for security reasons, the final step in pairing of a Formula with a User account at a TPV web site only occurs via the PHS API. Verification is performed only by the TPV using the PHS API and requires the User to supply their TPV Customer password to the TPV rather than to the PHS. In a non-limiting example, the Formula-site pairing performed within the PHS, the User submits the Site name selected and their TPV account username or email address to the PHS, which stores the information for use with the PHS API the next time the User logs in to the TPV site using the PHS. On that first login using PHS, the PHS recognizes the TPV account pairing has not been verified and presents the User with a field for entering the TPV account password. The User's TPV password remains in the browser where it can be verified, or rejected, by the TPV. In this embodiment, the User's TPV password is not sent to the PHS. If verified, the TPV reports true to the PHS; if not verified the TPV reports false. A false report may be due to the User not having an account on the TPV site, so the PHS may allow the User to create a new TPV account, as described in FIG. 10. A verified TPV response completes the PHS Formula-site pairing to a specific TPV Customer account.

While certain illustrative embodiments have been described, it is evident that many alternatives, modifications, permutations and variations will become apparent to those skilled in the art in light of the foregoing descriptions.

What is claimed is:

1. A method of password hopping comprising the steps of logging into an algorithm server,
creating a rule,
logging into an authentication server using a current password valid for the authentication server,
selecting one or more sources of dynamic data and selecting one or more coordinate positions within each of the one or more sources of dynamic data;
generating a new password that conforms to the rule utilizing said dynamic data,
changing the password at the authentication server from the current password to the new password, and
repeating the third, fourth, and fifth steps above for additional authentication servers, if any exist.

2. The method of password hopping according to claim 1, where creating a rule comprises selecting one or more items of dynamic data to use in the generation of password, selecting an order for combining the one or more items of dynamic data, and storing the one or more items of dynamic data and the order for combining the one or more items of dynamic data as the rule on the algorithm server.

3. The method of password hopping according to claim 1, where generating a new password that conforms to the rule comprises retrieving the dynamic data from each of the sources of dynamic data at the coordinate positions designated by the rule and combining one or more items of dynamic data in the order for combining the one or more items of dynamic data designated by the rule.

4. The method of password hopping according to claim 3, further comprising the step of performing a password hop.

5. The method of password hopping according to claim 4, where performing a password hop comprises the steps of determining that a time interval has elapsed, logging into an authentication server using a current password valid for the authentication server, generating a new password that conforms to the rule, changing the password at the authentication server from the current password to the new password, repeating the second, third, and fourth fifth steps above for additional authentication servers, if any exist, and resetting a timer to begin timing the time interval again; where creating a rule further comprises the step of selecting the time interval which triggers the next password hop.

6. The method of password hopping according to claim 5, where the method of password hopping serves as one factor in a multiple-factor authentication process.

7. The method of password hopping according to claim 4, where performing a password hop comprises the step of altering the rule.

8. A system for password hopping comprising
an algorithm server and a rule;
constructing said rule comprising one or more data sources, one or more coordinate positions, and an order for dynamic data;
where a user's device communicates with the algorithm server;
where the rule is specified by a user at the user's device and stored at the algorithm server.

9. The system for password hopping according to claim 8 where the algorithm server generates a new password by retrieving the dynamic data from the one or more data sources at the one or more coordinate positions and by combining the dynamic data in the order specified by the rule.

10. The system for password hopping according to claim 9, where the algorithm server logs in to an authentication server and changes a password from the current password to be the new password.

11. The system for password hopping according to claim 10, where the rule further comprises one or more characters and/or one or more integers; where the one or more characters and/or the one or more integers are used to generate the new password that conforms to the rule.

12. The system for password hopping according to claim 10, where the algorithm server comprises a timer; where the rule comprises a time interval; where responsive to determining that the time interval has elapsed, the algorithm server, logs in to an authentication server using the current password, generates the new password, and changes the password at the authentication server from the current password to the new password.

\* \* \* \* \*